(12) United States Patent
Wedding et al.

(10) Patent No.: US 11,879,584 B1
(45) Date of Patent: Jan. 23, 2024

(54) PIPE FITTING ADAPTER

(71) Applicants: Daniel Keith Wedding, Toledo, OH (US); Tricia Noelle Wedding, Toledo, OH (US)

(72) Inventors: Daniel Keith Wedding, Toledo, OH (US); Tricia Noelle Wedding, Toledo, OH (US)

( * ) Notice: Subject to any disclaimer, the term of this patent is extended or adjusted under 35 U.S.C. 154(b) by 0 days.

(21) Appl. No.: 17/520,643

(22) Filed: Nov. 6, 2021

Related U.S. Application Data

(63) Continuation-in-part of application No. 16/847,166, filed on Apr. 13, 2020, now Pat. No. 11,168,812.

(51) Int. Cl.
*F16L 55/11* (2006.01)
*F16L 3/127* (2006.01)

(52) U.S. Cl.
CPC .............. *F16L 55/11* (2013.01); *F16L 3/127* (2013.01)

(58) Field of Classification Search
CPC ........ F16L 55/10; F16L 55/11; F16L 55/1141; B65D 2251/08
USPC ...... 138/89, 90; 285/383, 31, 181, 341, 423; 215/247, 355; 220/801, 287, DIG. 19
See application file for complete search history.

(56) References Cited

U.S. PATENT DOCUMENTS

| | | | | | |
|---|---|---|---|---|---|
| 528,167 | A | * | 10/1894 | Jones | F16L 13/147 285/382.5 |
| 658,313 | A | * | 9/1900 | Bernardi | F16B 7/0426 403/300 |
| 2,321,667 | A | * | 6/1943 | Foster | F16L 55/1141 220/802 |
| 3,471,179 | A | * | 10/1969 | Sixt | F16L 25/14 285/148.22 |
| 3,610,288 | A | * | 10/1971 | Carr | B65D 59/00 138/96 R |
| 3,735,928 | A | * | 5/1973 | Watts | B05B 15/658 285/305 |
| 3,987,930 | A | * | 10/1976 | Fuson | A61M 39/20 220/287 |
| 4,602,504 | A | * | 7/1986 | Barber | G01M 3/2853 277/609 |
| 5,967,189 | A | * | 10/1999 | Cheng | G02B 6/3849 138/89 |
| 6,227,132 | B1 | * | 5/2001 | Garcia | B63J 99/00 251/263 |
| 6,408,887 | B2 | * | 6/2002 | Rahimzadeh | F16L 55/115 138/96 T |
| 7,464,727 | B1 | * | 12/2008 | Larson | F16L 55/11 138/92 |
| 8,261,927 | B1 | * | 9/2012 | Volzke | B65D 39/0041 220/287 |
| 8,267,273 | B2 | * | 9/2012 | Volzke | B65D 43/0222 220/212 |
| 8,931,763 | B2 | * | 1/2015 | Tharp | F16L 21/06 261/122.1 |
| 2004/0035483 | A1 | * | 2/2004 | Workman | F16L 55/11 138/89 |
| 2008/0011375 | A1 | * | 1/2008 | Soubjaki | F16L 55/115 138/89 |

(Continued)

*Primary Examiner* — Patrick F Brinson
(74) *Attorney, Agent, or Firm* — Donald K. Wedding

(57) ABSTRACT

A pipe adapter with two or more plugs, each plug is inserted into an opening in a different pipe fitting. The adapter permanently isolates the fittings from each other, while keeping the fittings a fixed distance apart.

9 Claims, 27 Drawing Sheets

(56) References Cited

U.S. PATENT DOCUMENTS

| | | | |
|---|---|---|---|
| 2009/0194730 A1* | 8/2009 | Clawson | F16L 55/1152 251/366 |
| 2012/0085453 A1* | 4/2012 | Lourigan | F16L 55/1108 138/89 |
| 2012/0192980 A1* | 8/2012 | Williams | F16L 55/11 138/89 |
| 2017/0211603 A1* | 7/2017 | Kennair, Jr. | F41A 11/02 |

* cited by examiner

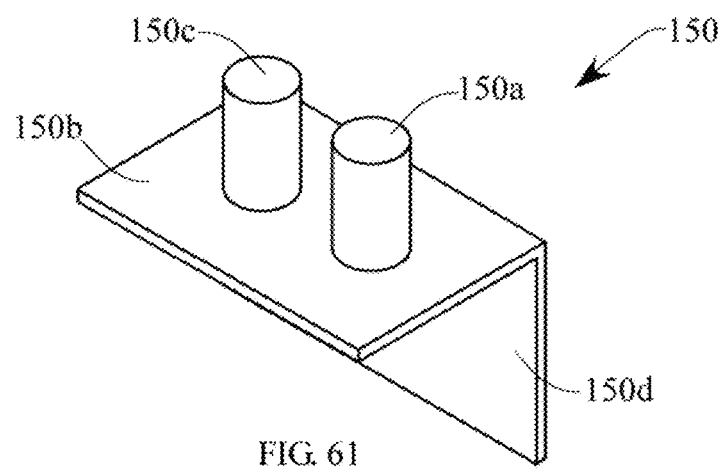
FIG. 61
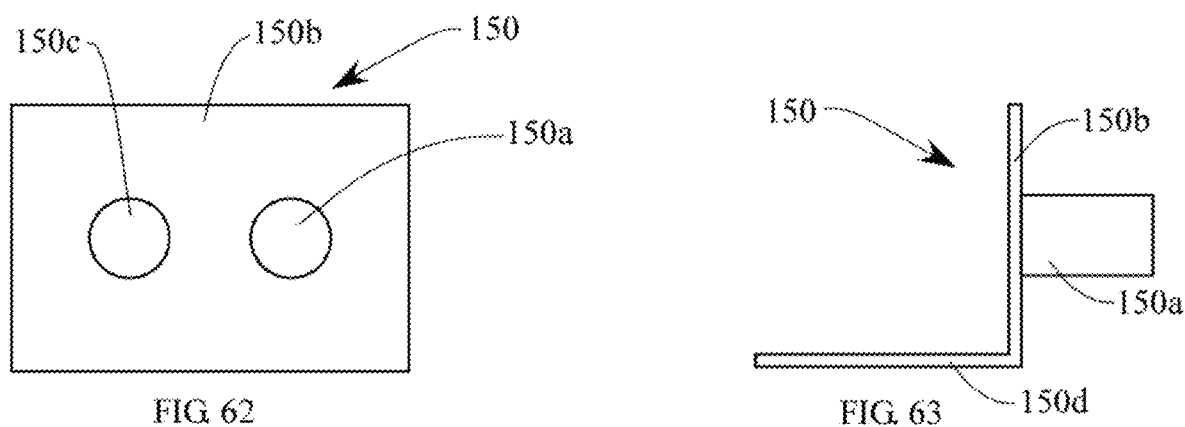
FIG. 62
FIG. 63
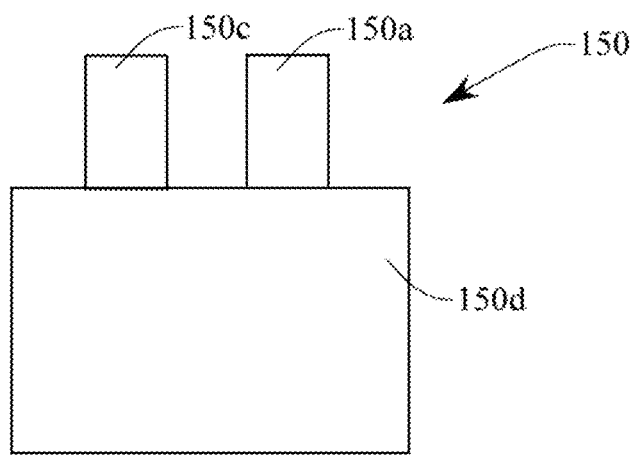
FIG. 64

PIPE FITTING ADAPTER

RELATED APPLICATION

This application is a continuation-in-part under 35 U.S.C. 120 of copending U.S. patent application Ser. No. 16/847,166, filed Apr. 13, 2020, to issue as U.S. Pat. No. 11,168,812 on Nov. 9, 2021, incorporated herein by reference.

BACKGROUND OF THE INVENTION

Currently pipes and fittings are used extensively in homes and in industry. Pipes and their fittings are used to hold or transport compressed air, solid particles, clean water, wastewater, oils, and all manners of solid, liquids, gasses, and fluids. Pipes used to hold any material or transport any material from one location to another are herein referred to as "transport pipes".

It is expressly stated that the term "fitting" or "pipe fitting" may apply to any type of fitting or connector or item that attaches to a pipe. These pipe fittings include, but are not limited to 90 degree elbows, 45 degree elbows, 90 degree street elbows, 45 degree street elbows, coupler, unions, reducers, tees, bushings, diverter tees, crosses, elbows, sweep elbows, clean outs, combo tees, sanitary tees, baffle tees, double sanitary tee, wye, and side inlet tee.

Pipes are attached to fittings by inserting the pipe into an opening (also called a socket) in the fitting. The pipes and fittings may be attached to each other using different attachment types. It is expressly stated that the term "attachment type" refers to any way to attach a pipe to a pipe fitting. Pipe to pipe fitting attachment types include, but are not limited to, threads, mechanical fastening, glues, chemical bonds, solvent welds, brazing, welding, compression, flare fittings, rubber sleeve fittings, and crimping.

Pipes and their fittings are made of different "pipe materials" depending upon their use. It is expressly stated that the term pipe materials refers to any material that a pipe or pipe fitting may be made of. Pipe materials include, but are not limited to, soft copper, copper, rigid copper, poly vinyl chloride (PVC), chlorinated poly vinyl chloride (CPVC), iron, aluminum, and steel.

Pipes and pipe fittings also come in many different "pipe sizes". It is expressly stated that the term pipe size refers to any diameter that pipes and fittings may come in. Pipe sizes include, but are not limited to, ¼", ⅜", ½", ¾", 1", 1¼", 1½", 2", 3", and 4" diameter.

Pipes and pipe fittings may need to attach to a "structure" or "support structure". It is expressly stated that the term structure and/or support structure refers to anything that a pipe may need to be attached. The structure a pipe may be attached to includes, but is not limited to, floor joists, wall studs, ceiling joists, ceiling rafters, joists, metal framing, metal joists, plywood, planks, trusses, bracing, blocking and flooring.

Pipes and pipe fittings come in different wall thicknesses referred to as a "schedule". It is expressly stated that the term "schedule" and/or "pipe schedule" refers to any wall thickness that pipes and fittings may come in. Pipe schedules include, but are not limited to, Schedule 10, Schedule 20, Schedule 30, Schedule 40, and Schedule 80.

For safety, neatness, and proper operation; transport pipes and pipe fittings must be installed following strict building codes and regulations set forth by local planning commissions. These codes regulate all aspects of transport pipe installation. Building codes regulate how close two transport pipes can be to each other, the slope of the drainage transport pipes, and bow the pipes are mounted to the structure. Building codes also regulate the material the pipe material, the pipe size, the schedule of the pipe, and the pipe and pipe fitting attachment type. Pipe installers must take extreme care to follow all building codes and regulations so that the pipe assembly will pass the inspection of the local authority. Installing pipes so that they meet all of the different codes is a laborious task to perform and is just as laborious for the inspector to verify. To compound the problem there are limited choices when it comes to mounting a transport pipe to a structure.

One method to mount a pipe to a support structure is with strapping, this is a metal ribbon with holes in it. The strap is cut and used to make a sling; the sling is then fastened to a floor, wall, ceiling, post, or like structure or substrate with a nail or screw in order to secure the transport pipe. Strapping can be made of steel, brass, copper, rubber, or any number of materials. The main drawback of this method is that the cut ends of the straps are sharp and can cut the installer or anyone who touches the straps. Care must also be taken to avoid a reaction between dissimilar metals, for example a galvanized steel pipe and a copper strap. Lastly, these types of supports only suspend the pipe. If the pipe is running vertically, this mounting method is ineffective.

Another way to mount a pipe to a support structure is with a single clamp. These half circles hold the pipes against the support structure. Clamps can be used in a vertical or a horizontal manner. Clamps are mounted over the pipe and not the pipe fitting. When clamps are mounted close to pipe fittings the clamp will pull the transport pipe into contact with the structure while the fitting is holding the transport pipe away from the support structure. This distortion may damage the connection causing the pipes to leak. Even if the clamp does not damage the nearby pipe fitting connection, the clamps still forces the pipe to be in direct contact with the support structure. If the transport pipe is in contact with the structure, the pipes may make noise as they expand and contract with changes in temperature. Furthermore, when the transport pipe is in contact with the structure the transport pipe cannot be insulated on all sides of the transport pipe with pipe wrap or spray foam.

Independent of how the transport pipe is mounted to the structure, it is very difficult to achieve consistent slopes and consistent pipe to pipe spacing. These mounting methods further requires the installer to stock many types of clamps for all the pipe sizes that they may encounter.

It is obvious there is a need for a device that will easily mount a pipe to a structure in a manner that isolates the pipe from the structure and allows the pipe to have insulation installed on all sides.

Another problem that is encountered is keeping a consistent spacing between pipes. Plumbers often need to run two pipes in parallel. This might be hot and cold-water pipes, chilled water and chilled water return, radiator supply and radiator return pipes, or any other pipes applications that may follow a loop. There is also a need for a device that will easily maintain an equal distance between the two pipes.

To avoid these problems, a novel pipe fitting attachment is presented where the attachment is inserted into one of the openings in a pipe fitting and not around the transport pipe. This attachment can be used to hold parallel pipes at a fixed distance apart and easily attach the pipe fitting along with the attached transport pipe to the desired structure.

PRIOR ART

Pipe plugs and caps are known in the prior art including U.S. Pat. No. 658,313 (Bernardi et al.), U.S. Pat. No.

2,356,987 (Gallop), U.S. Pat. No. 2,373,242 (Glashow), U.S. Pat. No. 3,494,504 (Jackson), U.S. Pat. No. 3,586,056 (Kipp et al.), U.S. Pat. No. 3,610,288 (Carr), U.S. Pat. No. 3,677,301 (Williams), U.S. Pat. No. 4,672,993 (Bilak), U.S. Pat. No. 5,224,515 (Foster et al.), U.S. Pat. No. 5,797,431 (Adams), U.S. Pat. No. 6,062,262 (Tash), U.S. Pat. No. 6,758,244 (Workman et al.), U.S. Pat. No. 7,171,987 (Serret), U.S. Pat. No. 7,225,836 (Field), U.S. Pat. No. 8,490,691 (Purkis), and U.S. Patent Application Publication No. 2005/0241710 (Early et al.), all incorporated herein by reference .

Pipe hangers and supports are known in the prior art including U.S. Pat. No. 4,407,478 (Hodges), U.S. Pat. No. 5,040,753 (Roth), U.S. Pat. No. 5,351,920 (Decky et al.), U.S. Pat. No. 6,164,604 (Cirino et al.), U.S. Pat. No. 6,367,744 (Ebersole), U.S. Pat. No. 6,691,742 (Cooper), U.S. Pat. No. 8,003,511 (Grivas et al.), U.S. Pat. No. 8,186,725 (Ward), U.S. Pat. No. 8,256,800 (Ward), U.S. Pat. No. 8,448,995 (Ward), U.S. Pat. No. 8,882,057 (Dworak, Jr.) U.S. Pat. No. 9,191,414 (Imoto), U.S. Pat. No. 9,222,602 (Dworak, Jr.), 9U.S. Pat. No. ,366,361 (Miner et al.), U.S. Design Pat. No. D691,246 (Ward), U.S. Patent Application Publication Nos. 2012/0025034 (Tumer.), and 2013/0068900 (Heath), all incorporated herein by reference.

BRIEF SUMMARY OF THE INVENTION

The invention described herein, comprises a new adapter or insert with a multiplicity of plugs wherein each plug is inserted into an opening of a multiplicity of pipe fittings so that the pipe fittings are a fixed distance apart while the plugs on the adapter prevent the material being transported by the pipe fittings from mixing. The plugs will connect two or more fittings together while isolating the fittings from each other. The article described herein improves the quality and speed of the installation of many different types of parallel pipes. While the present invention has been illustrated by the description of embodiments thereof in considerable detail, it is not the intention of this application to restrict or in any way limit the scope of the appended claims to such detail. This extensive detail is meant to demonstrate the more general concept.

Additional advantages, modifications, and minor variations will readily appear to those skilled in the art. For example, although not specified in the examples, the present invention may be applied to different pipe fittings including, but not limited to, plugs, unions, male and female adapters, flanges, thirty-degree bends, forty-five-degree bends, ELLS, crosses, WYES, couplers, and reducing fittings.

Different attachment methods may also be used; for example, smooth plugs may be employed instead of threaded plugs. Threads may be employed instead of solvent welds or solder on the adapter plugs. There may be different types of attachment methods on the same adapter. For example, a single adapter may have one plug that is a solvent weld and the other plug that may be threaded.

It is also contemplated that a single adapter may have multiple materials on the same adapter. For example, on a single adapter there may be one PVC plug used for solvent welding and a different plug may be copper that can be soldered to a copper fitting.

The plug allows two different pipe sizes to be attached to each other. For example, an adapter may have a plug designed to be inserted into a ¾ pipe fitting and a different plug on the same adapter may be designed to be inserted into a ½ pipe fitting.

It is also contemplated that a single adapter may have multiple materials on the same adapter as well as different sizes. For example, on a single adapter there may be one ½" PVC plug used for solvent welding and a different plug may be 1" threaded iron that can be screwed into a 1" threaded pipe fitting.

Therefore, the invention, in its broader aspects, is not limited to the specific details, the representative apparatus, and illustrative examples shown and described. Accordingly, departures may be made from such details without departing from the spirit or scope of the applicant's general inventive concept.

The invention described herein is characterized as an insert for permanently sealing off or permanently isolating one opening or socket of a pipe fitting while allowing a pipe to share the same socket thereby converting the pipe into a mounting point.

The invention herein allows two or more pipe fittings to be joined together. Once inserted between two fittings, the adapter physically joins two pipe fittings together while still isolating the contents of the two pipe fittings. The invention also keeps the pipes a fixed distance apart to allow the pipes to be run neatly.

The scope of the invention describes a pipe fitting mount, also referred to as a support, as a new article of manufacture. This novel mount is used to convert an opening in a standard pipe fitting into a structural mounting point. A structural mounting point is created by the inserting a plug that is on the mount into the opening of a pipe fitting. Said mount also has a plate or tab attached to it that is used to attach the plug and pipe fitting to a structure. The remaining openings on the pipe fitting can still be used as a transport pipe coupler.

Using a pipe to support an object is not a new idea. Iron pipes are commonly used as closet rods. When attaching iron pipes to a wall, ceiling, or floor, a "flange" is often used. A flange is a plate with a multiplicity of holes meant to accept screws, nails, or other like fasteners so the flange is securely mounted to a structure. The flange also has a threaded hole that accepts the threaded end of an iron pipe. When an iron pipe is attached to a flange, the pipe end is open and unplugged. With the use of a flange, iron pipes have been used as stairway handrail and closet rods for years. Iron flanges have been mounted to ceilings and pipes attached to them to allow large light fixtures to be suspended in warehouses. These flanges are mostly used for structural support and are not sealed so they are not, and cannot, be used to transport materials such as a gas or liquid.

Blocking the end of a pipe is also not a novel idea. End caps are common methods used to block the end of a pipe and prevent the fluid being transported from escaping. This type of blocking method is attached to the outside of the pipe, thus making the end of the pipe too thick to fit inside of a pipe fitting or a flange.

The invention described herein, comprises a new pipe mount that converts the pipe fitting or pipe connector, into a support mount. The mount will improve the quality and speed of the installation of many different types of pipes. While the present invention has been illustrated by the description of embodiments thereof, and while the embodiments have been described in considerable detail, it is not the intention of this application to restrict or in any way limit the scope of the appended claims to such detail. This extensive detail is meant to demonstrate the more general concept.

Additional advantages, modifications, and minor variations will readily appear to those skilled in the art. For example, although not specified in the examples, the present invention may be applied to, but not limited to, plugs, connectors, unions, male and female adapters, flanges, thirty-degree bends, forty-five degree bends, ELLS, crosses, WYES, and reducing fittings. Furthermore, smooth inserts may be employed instead of threads and vice-versa. Male ends and female ends may be reversed, and the same result would be achieved. Therefore, the invention, in its broader aspects, is not limited to the specific details, the representative apparatus, and illustrative examples shown and described. Accordingly, departures may be made from such details without departing from the spirit or scope of the applicant's general inventive concept.

The invention described herein is a permanently isolated or sealed plug that is inserted into a pipe fitting that has a mounting flange attached to it. The inserted plug will not allow the contents of the pipe to flow into the mounting flange. Unlike other mounting methods, this mounting method takes advantage of one of the joint openings that is normally used to transport materials. The number of openings of the joint is reduced by at least one connection point.

This allows designated pipes fittings to be used to mount the pipe to a wall, floor, ceiling, or any other structure, while at the same time allow the remaining pipe fitting openings to transport its designated material without leakage.

Due to the vast number of combinations and permutations of pipes and fittings, the invention described herein is demonstrated with a series of specific examples. These examples should not be construed as to limit the scope of the invention to these specific examples. It is obvious to anyone skilled in the art that the invention described here in could be applied to any pipe material, pipe thickness, pipe size, fitting type, or fitting attachment method.

BRIEF DESCRIPTION OF THE DRAWINGS

FIG. 61 is a perspective view of another embodiment of the invention.

FIG. 62 is a top view of the embodiment of FIG. 61.

FIG. 63 is a side view of the embodiment of FIG. 61.

FIG. 64 is another side view of the embodiment of FIG. 61.

DETAILED DESCRIPTION OF THE DRAWINGS

Due to the vast number of combinations and permutations of pipe diameters, pipe fitting attachment method and fittings, the invention described herein is demonstrated with a series of specific examples. These examples should not be construed as to limit the scope of the invention to these specific examples. It is obvious to anyone skilled in the art that the invention described herein could be applied to any pipe material, pipe thickness, pipe diameter, fitting type, or fitting attachment method including, but not limited to, PVC, CPVC, cast iron, and cross-linked polyethylene (PEX, XPE, XLPE). These embodiments may be applied to any pipe wall thickness, including, but not limited to, schedule 10, schedule 20, and schedule 40. The embodiments illustrated herein may be applied to any pipe diameter, including but not limited to, ½-inch, ¾-inch, 1-inch, 2-inch, 3-inch and 4-inch. These embodiments may be applied to any pipe attachment method, including, but not limited to, solvent welds, threaded ends, and compression ends. It is obvious that as the type of pipe changes the embodiment will also be altered to match the pipe. The figures depict tees, however other fittings including, but not limited to, crosses, wyes, flanges, and couplers are contemplated.

Figure 1:
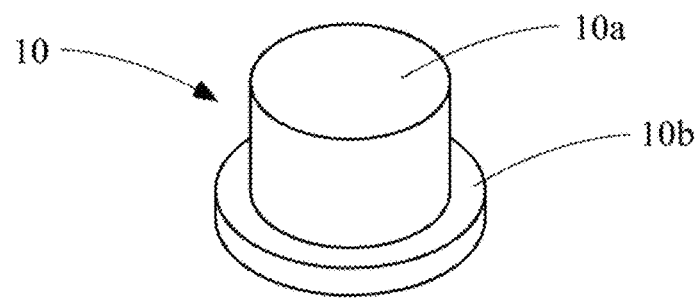
FIG. 1 is a perspective view of one embodiment of the invention.

FIG. 1 is a perspective view of one embodiment of the invention. The insert or adapter plug 10 comprises a plug 10a and an optional flange 10b used to limit how far plug 10a can be inserted into a pipe (not shown).

Figures 2, 3, 4:
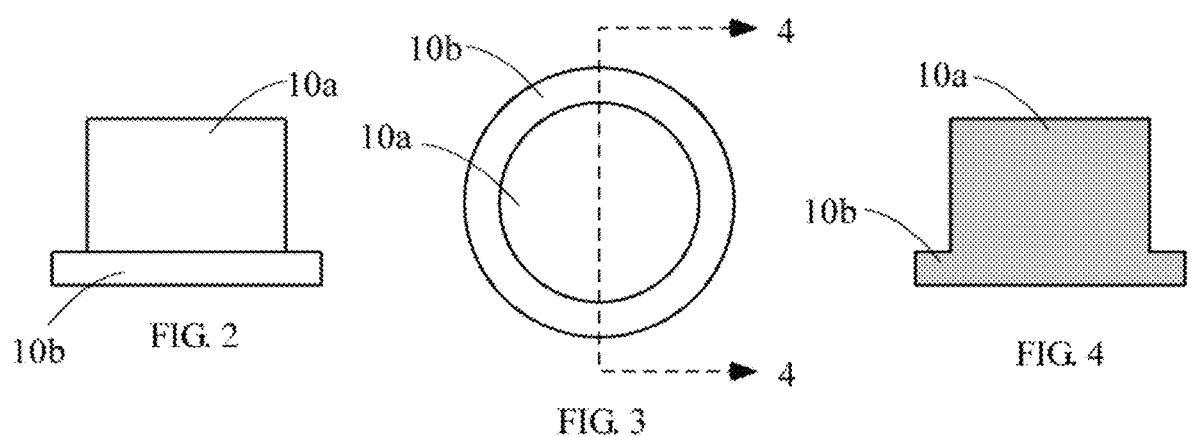
FIG. 2 is a side view of the embodiment of FIG. 1.
FIG. 3 is a top view of the embodiment of FIG. 1.
FIG. 4 is a section 4-4 view of the embodiment of FIG. 1.

FIG. 2 is a side view of the embodiment of FIG. 1. Shown are the plug 10a and the optional flange 10b.

FIG. 3 is a top view of the embodiment of FIG. 1. Shown are the plug 10a and the optional flange 10b.

FIG. 4 is a section 4-4 view of the embodiment of FIG. 1. Shown are the plug 10a and the optional flange 10b.

Figure 5:
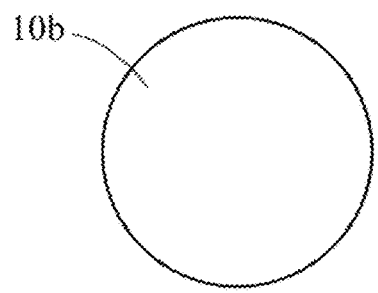
FIG. 5 is a bottom view of the embodiment in FIG. 1.

FIG. 5 is a bottom view of the embodiment in FIG. 1. Shown herein is the optional flange 10b.

Figure 6:
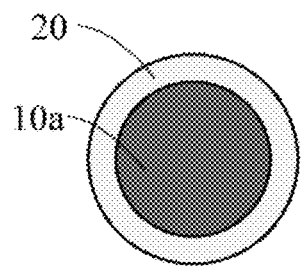
FIG. 6 is an end view of the embodiment in FIG. 1 mounted in a pipe.

FIG. 6 is an end view of the embodiment in FIG. 1. Shown are the plug 10a mounted in a pipe 20.

Figure 7:
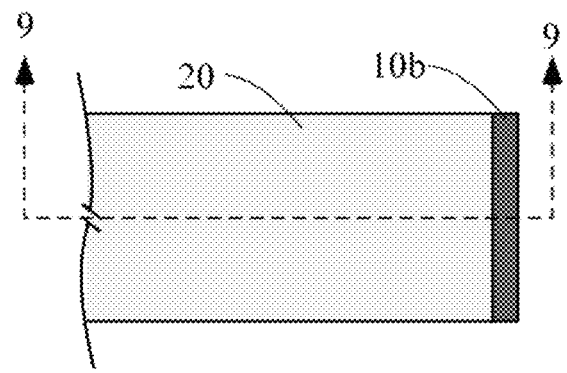
FIG. 7 is a side view of the embodiment in FIG. 1 mounted in a pipe.

FIG. 7 is a side view of the embodiment in FIG. 1. Shown are the optional flange 10b mounted in a pipe 20. Optional flange 10b has the same outside diameter as the pipe it is inserted into so that the pipe 20 and the optional flange 10b can be inserted into a pipe fitting (not shown).

Figure 8:
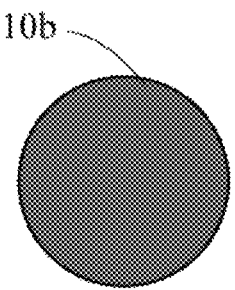
FIG. 8 is an opposite end view of the embodiment in FIG. 6 mounted in a pipe.

FIG. 8 is an opposite end view of the embodiment in FIG. 6 mounted in a pipe. The flange 10b is visible mounted in a pipe 20 (not shown).

Figure 9:
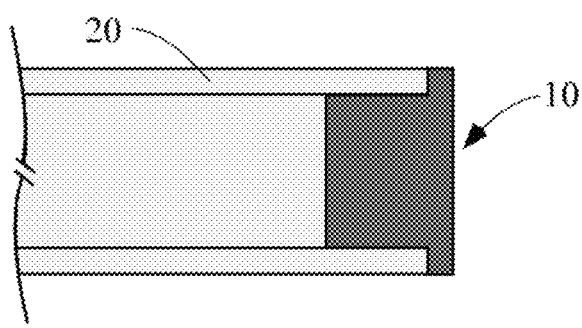
FIG. 9 is a section 9-9 view of the embodiment in FIG. 1 mounted in a pipe.

FIG. 9 is a section 9-9 view of the embodiment in FIG. 1, 10, mounted in a pipe 20.

Figure 10:
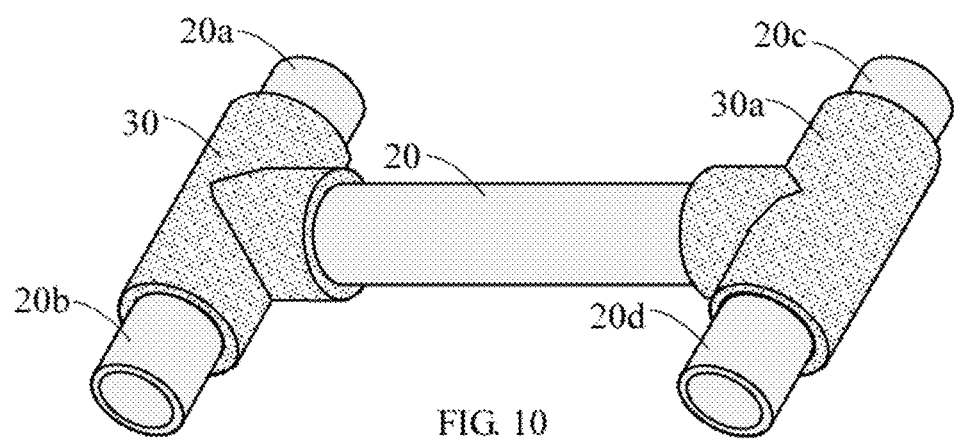
FIG. 10 is a perspective view of the embodiment in FIG. 1 and a tee fitting.

FIG. 10 is a perspective view of the embodiment in FIG. 1, pipes 20, 20a, 20b, 20c, 20d, and a tee fitting 30. The opposite end of the pipe 20 is mounted into another tee fitting 30a. Tee fittings are depicted in the drawings; it is understood that any fitting may be used. Pipes 20a and 20b are coupled together by tee 30 and are permanently isolated from pipes 20c and 20d which are coupled together by tee 30a.

Figure 11:
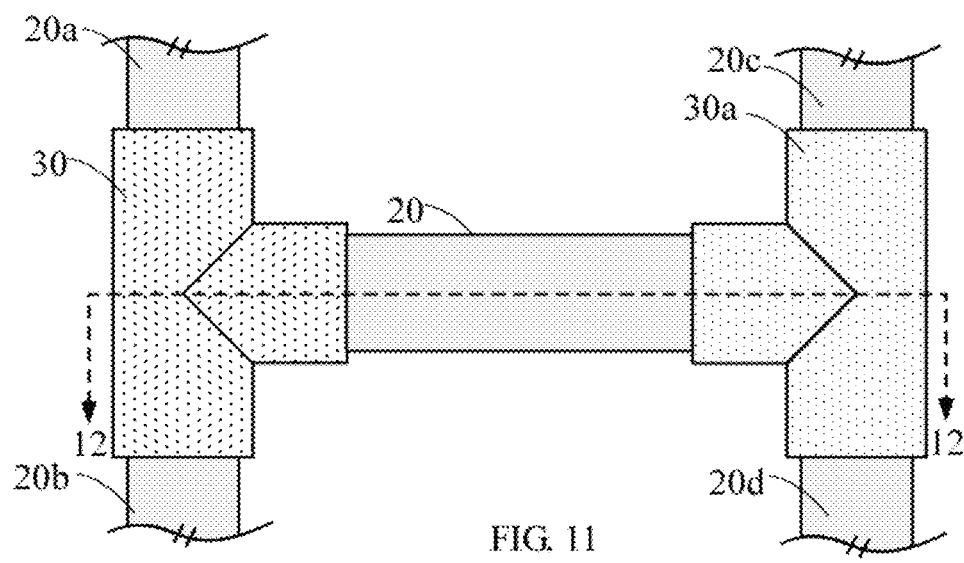
FIG. 11 is a side view of the embodiment in FIG. 1 and a tee fitting.

FIG. 11 is a side view of the embodiment in FIG. 1, pipes 20, 20a, 20b, 20c, 20d, and tee fittings 30, 30a. This I-shaped structure may be mounted to a support structure such as a joist (not shown) by means of a pipe clamp or pipe strap.

Figure 12:
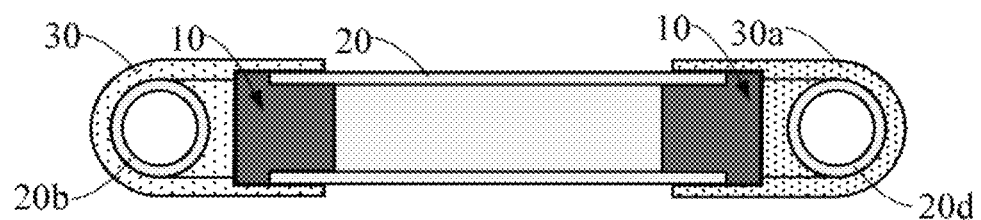
FIG. 12 is a section 11-11 view of the embodiment in FIG. 1 and a tee fitting.

FIG. 12 is a section 11-11 view of the embodiment in FIG. 1, showing insert or adapter plug 10, pipes 20, 20a, 20b, 20c, 20d, and tee fittings 30, 30a. This figure shows how the insert or adapter plug 10 isolates pipe 20 from pipes 20a (not shown) and 20b and pipes 20c and 20d.

Figure 13:
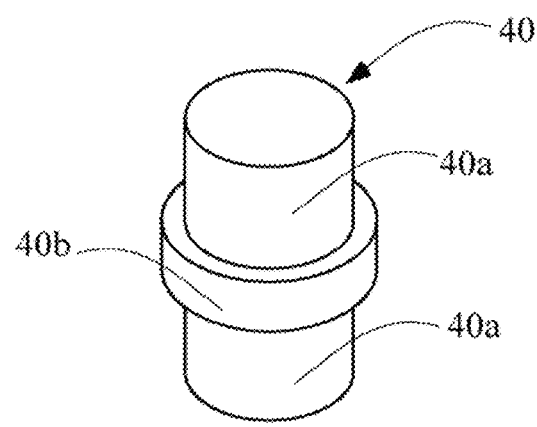
FIG. 13 is a perspective view of another embodiment of the invention.

FIG. 13 is a perspective view of another embodiment of the invention, 40, showing optional flange 40b and two plugs 40a. The plugs 40a fit inside of one opening of a pipe fitting (not shown) in order to permanently seal the socket closed thereby converting one opening or socket of said pipe fitting into a point used for support or mounting, while still allowing the fitting to function as a coupler for two pipes. The pipe fittings (not shown) are spaced apart at a fixed spacing by the pipe fitting adapter.

Figure 14:
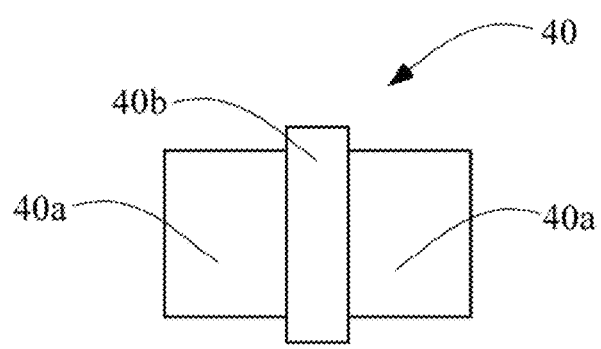
FIG. 14 is a side view of the embodiment of FIG. 13.

FIG. 14 is a side view of the embodiment of FIG. 13, 40, showing optional flange 40b and two plugs 40a.

Figure 15:
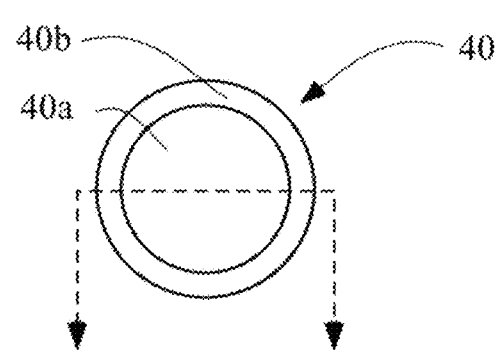
FIG. 15 is a top view of the embodiment of FIG. 13.

FIG. 15 is a top view of the embodiment of FIG. 13, 40, showing optional flange 40b and two plugs 40a.

Figure 16:
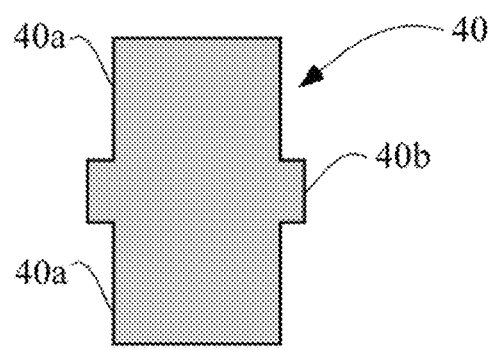
FIG. 16 is a section 16-16 view of the embodiment of FIG. 13.

FIG. 16 is a section 16-16 view of the embodiment of FIG. 13, 40, showing optional flange 40b and two plugs 40a.

Figure 17:
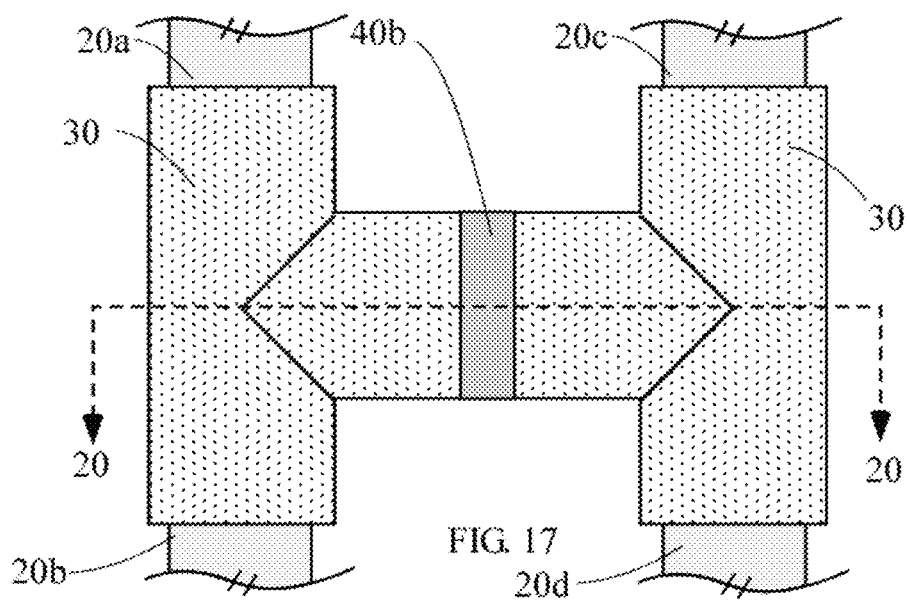
FIG. 17 is a front view of the embodiment in FIG. 13 and a tee fitting.

FIG. 17 is a front view of the embodiment in FIG. 13, 40, two tee fittings 30 oriented parallel to each other, and the optional flange 40b.

Figure 18:
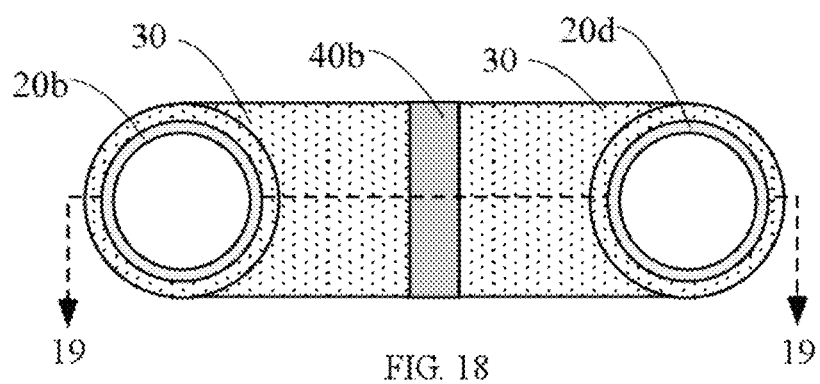
FIG. 18 is a side view of the embodiment in FIG. 13 and a tee fitting.

FIG. 18 is a side view of the embodiment in FIG. 13, 40, two tee fittings 30 oriented parallel to each other, and the optional flange 40b.

Figure 19:
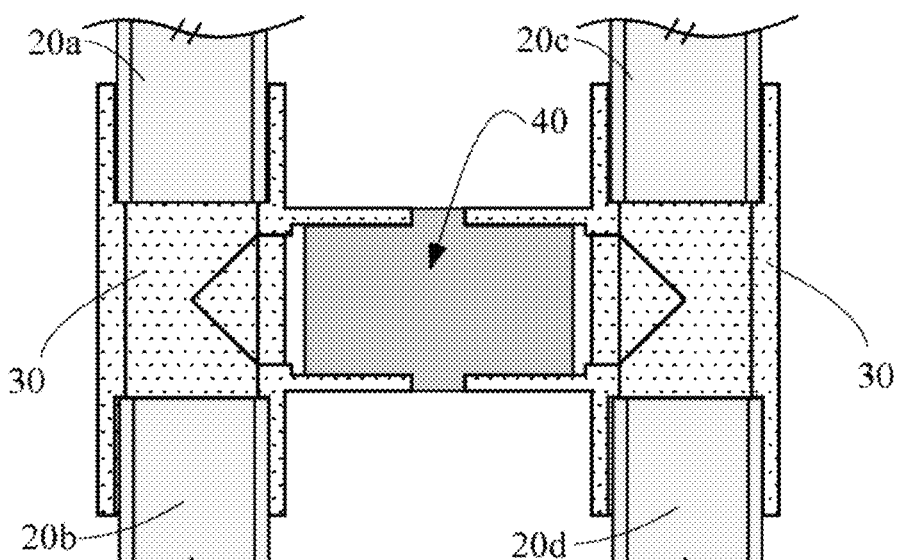
FIG. 19 is a section 19-19 view of the embodiment in FIG. 13 and a tee fitting.

FIG. 19 is a section 19-19 view of the embodiment in FIG. 13, 40, and two tee fittings 30 oriented parallel to each other. By altering the overall length of the embodiment in FIG. 13, 40, the distance between the two tee fittings (30) can be increased or decreased.

Figure 20:
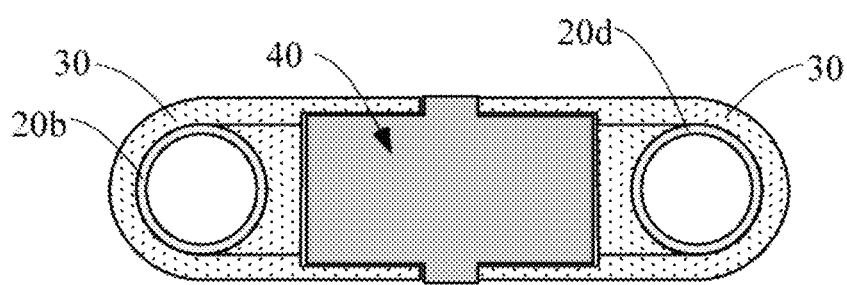
FIG. 20 is a section 20-20 view of the embodiment in FIG. 13 and a tee fitting.

FIG. 20 is a section 20-20 view of the embodiment in FIG. 13, 40, and two tee fittings 30 oriented parallel to each other.

Figure 21:
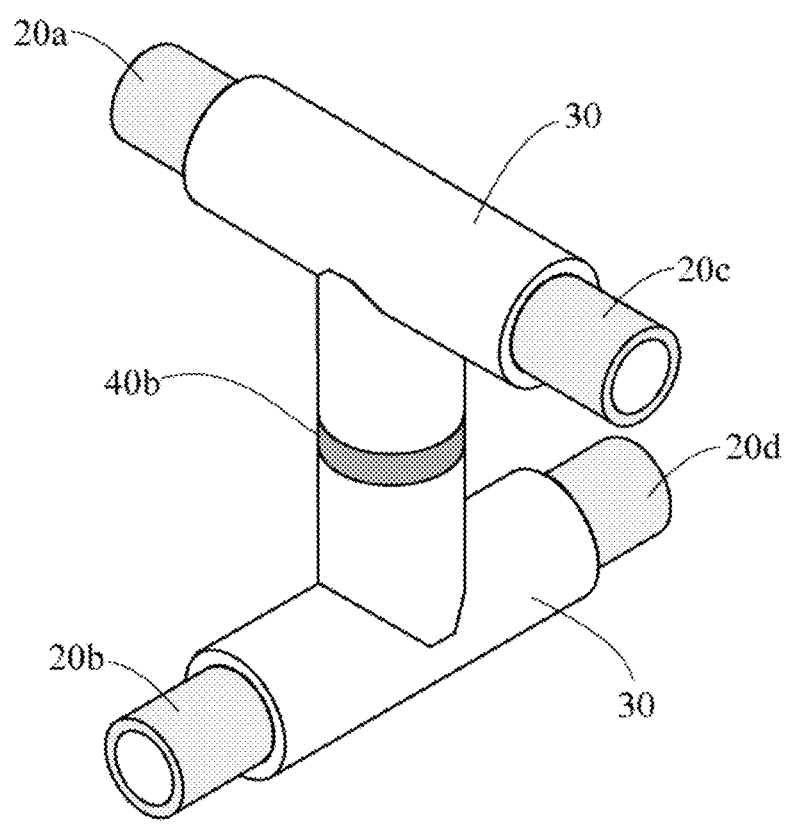
FIG. 21 is a perspective view of another embodiment of the invention.

FIG. 21 is a perspective view of another embodiment of the invention showing two tee fittings 30 oriented perpendicular to each other, and the optional flange 40b.

Figure 22:
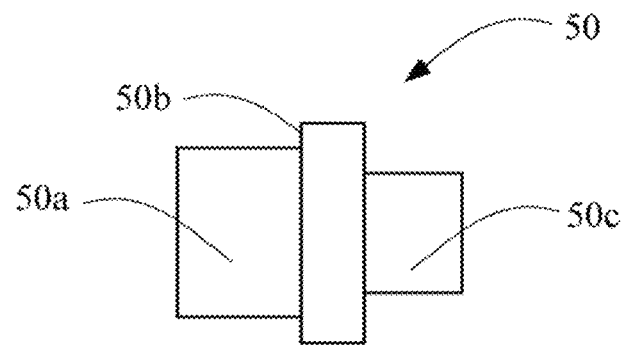
FIG. 22 is a side view of another embodiment of the invention.

FIG. 22 is a side view of another embodiment of the invention, 50 with plug 50a being a different pipe size than 50c separated by optional flange 50b, plugs 50a and 50c may be the same material and/or the same or different schedules.

Figure 23:
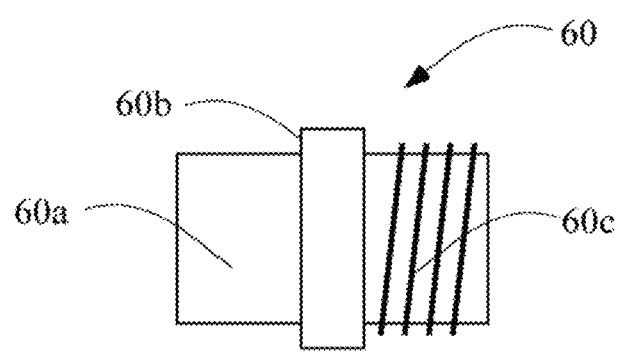
FIG. 23 is a side view of another embodiment of the invention.

FIG. 23 is a side view of another embodiment of the invention, 60 with plug 60a being a solvent weld plug separated by an optional flange 60b from the other plug 60c which is threaded. Plugs 60a and 60c may or may not be different pipe sizes and/or schedules. Plugs 60a and 60c may or may not be made of different pipe materials for example, PVC and copper.

Figure 24:
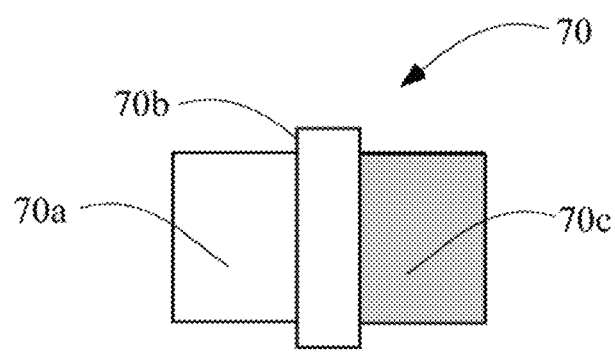
FIG. 24 is a side view of another embodiment of the invention.

FIG. 24 is a side view of another embodiment of the invention, 70 with plug 70a being a different pipe material than 70c separated by optional flange 70b. Plugs 70a and 70c may or may not be different pipe sizes or schedules. Plugs 70a and 70c may or may not have the same attachment types.

The embodiments of FIGS. 22 through 24 may be in any combination. For example, ½" solvent weld PVC schedule 80 on one side and 1" threaded brass on the other, or ¾" solvent weld schedule 40 PVC and solvent weld schedule 80 CPVC.

Figure 25:
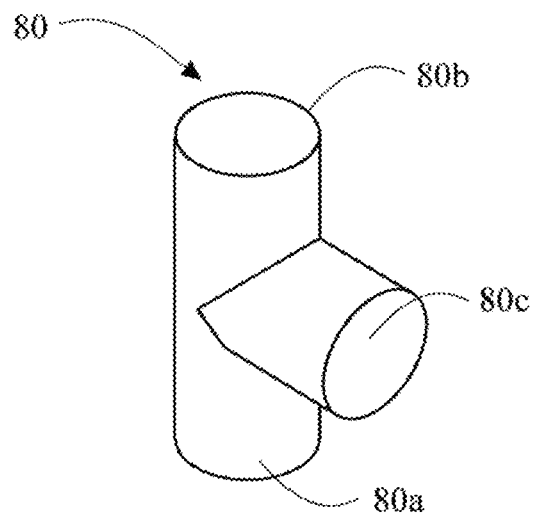
FIG. 25 is a perspective view of another embodiment of the invention.

FIG. 25 is a perspective view of another embodiment of the invention, 80. This embodiment has three plugs 80a, 80b, and 80c. 80c is perpendicular to 80a and 80b.

Figure 26:
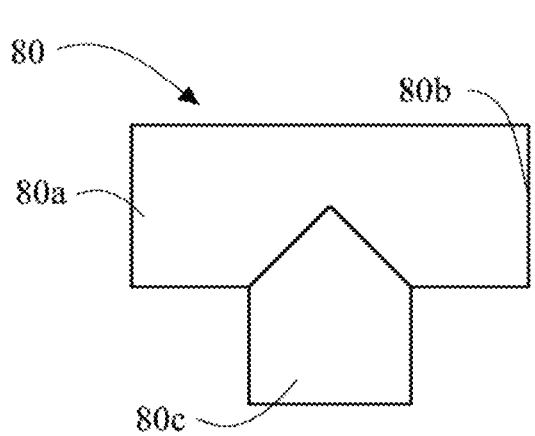
FIG. 26 is a side view of the embodiment of FIG. 25.

FIG. 26 is a side view of the embodiment, 80, showing the three plugs 80a, 80b, and 80c.

Figure 27:
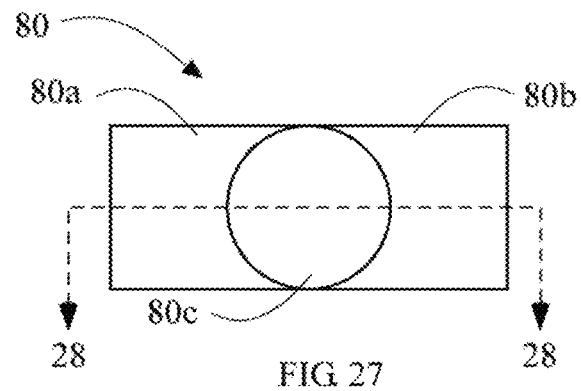
FIG. 27 is a top view of the embodiment of FIG. 25.

FIG. 27 is a top view of the embodiment, 80, showing the three plugs 80a, 80b, and 80c.

Figure 28:
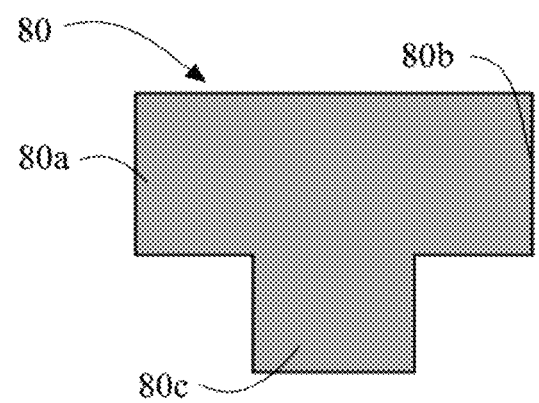
FIG. 28 is a section 28-28 view of the embodiment of FIG. 25.

FIG. 28 is a section 28-28 view of the embodiment, 80, showing the three plugs 80a, 80b, and 80c.

Figure 29:
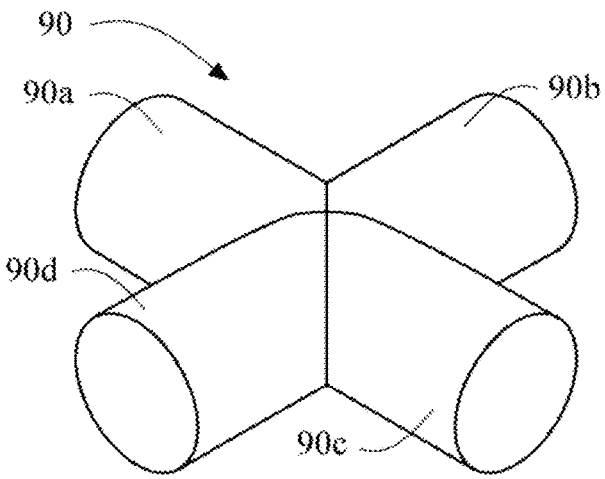
FIG. 29 is a perspective view of another embodiment of the invention.

FIG. 29 is a perspective view of another embodiment of the invention, 90. This embodiment has four plugs 90a, 90b, 90c, and 90d. 90b and 90d are perpendicular to 90a and 90c.

Figure 30:
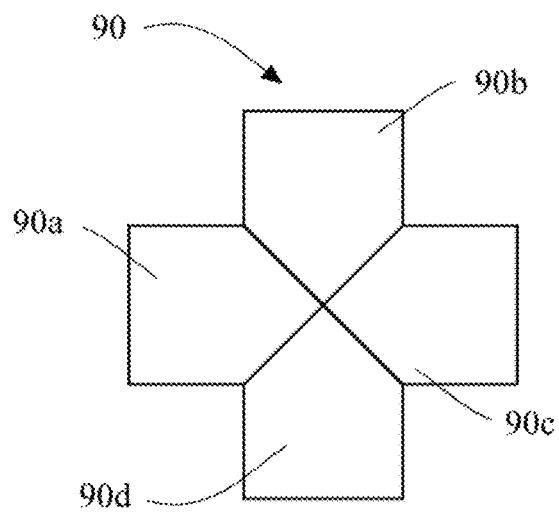
FIG. 30 is a side view of the embodiment of FIG. 29.

FIG. 30 is a side view of the embodiment, 90, showing the four plugs 90a, 90b, 90c, and 90d.

Figure 31:
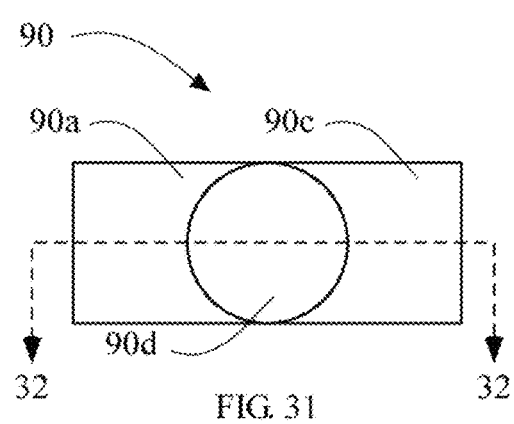
FIG. 31 is a top view of the embodiment of FIG. 29.

FIG. 31 is a top view of the embodiment, 90, showing three of the four plugs 90a, 90c, and 90d.

Figure 32:
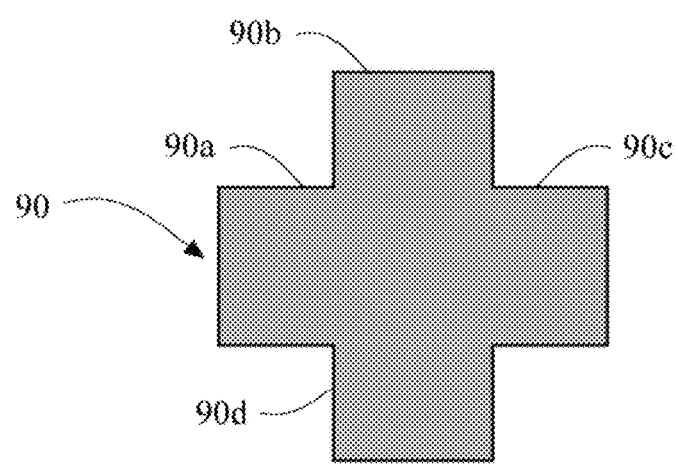
FIG. 32 is a section 32-32 view of the embodiment of FIG. 29.

FIG. 32 is a section 32-32 view of the embodiment, 90, showing the four plugs 90a, 90b, 90c, and 90d.

Figure 33:
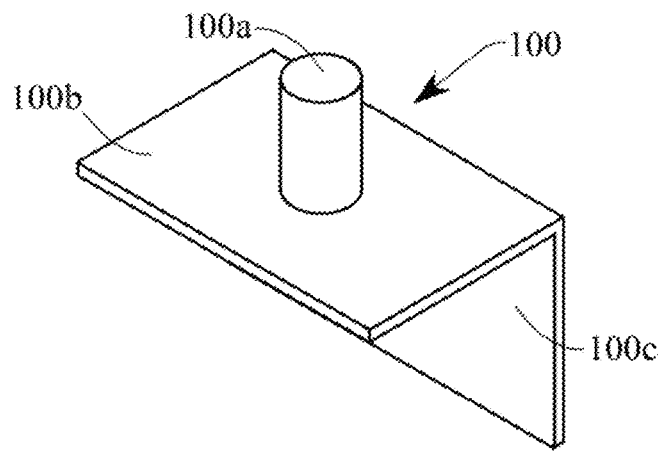
FIG. 33 is a perspective view of another embodiment of the invention.

FIG. 33 is a perspective view of another embodiment of the invention, 100. The plug 100a fits inside of one opening of a pipe fitting (not shown) in order to permanently seal the socket closed thereby converting one opening or socket of said pipe fitting into a point used for support or mounting, while still allowing the fitting to function as a coupler for two pipes. Plate 100b and/or optional plate 100c are used to attach the embodiment, 100 to a support structure. If optional plate 100c is not incorporated, then the embodiment 100 may be mounted to a flat support structure. If the optional plate 100c is incorporated, then the invention of FIG. 33 may be mounted on the edge of a support structure.

Figure 34:
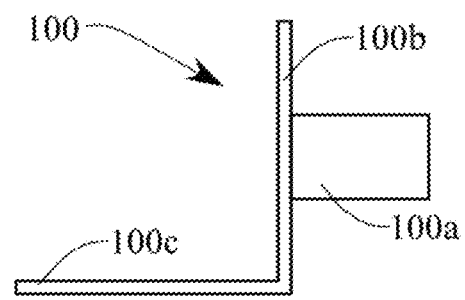
FIG. 34 is a side view of the embodiment of FIG. 33.

FIG. 34 is a side view of the embodiment, 100 showing plug 100a, plate 100b, and optional plate 100c. Plates 100b and optional plate 100c are perpendicular to each other and form an L-shaped structure to which the plug 100a is attached. Optional plate 100c may be made so it can be removed by the consumer if desired.

Figure 35:
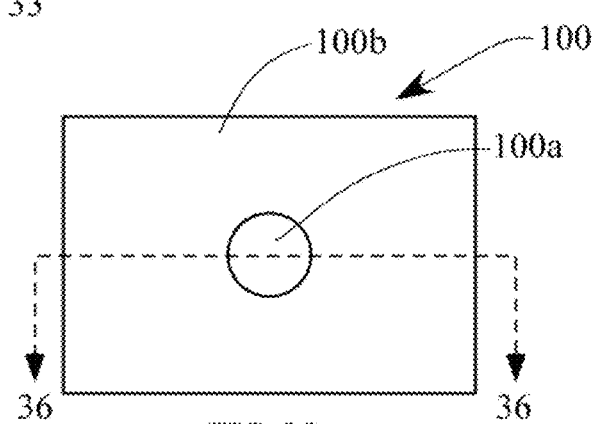
FIG. 35 is a top view of the embodiment of FIG. 33.

FIG. 35 is a top view of the embodiment, 100 showing plug 100a and plate 100b. Plug 100a is attached to the face of plate 100b.

Figure 36:
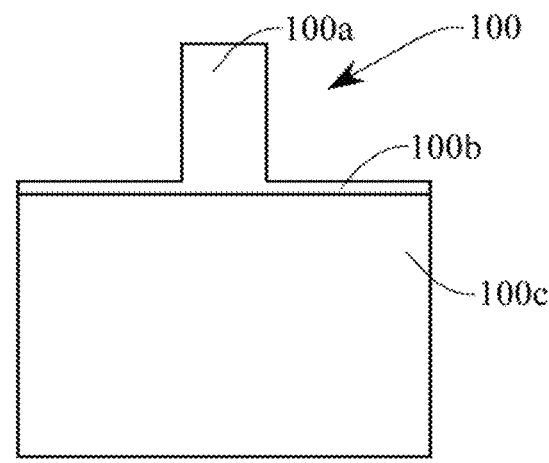
FIG. 36 is a section 36-36 view of the embodiment of FIG. 33.

FIG. 36 is a section 36-36 view of the embodiment of FIG. 33 showing the optional plate 100c and plug 100a attached to plate 100b.

Figure 37:
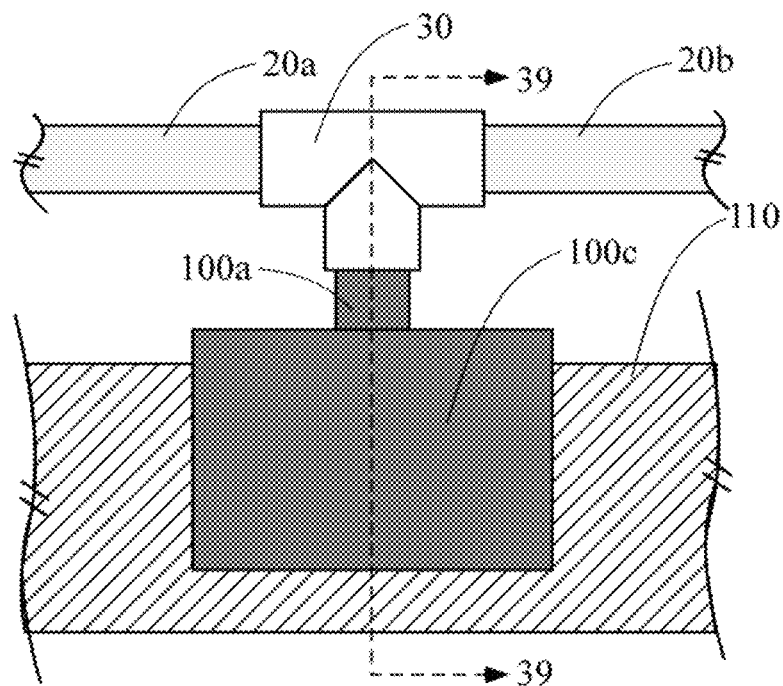
FIG. 37 is a side view of the embodiment of FIG. 33 with a tee and mounted on a joist.

FIG. 37 is an environmental side view of the embodiment of FIG. 33 showing optional plate 100c and a tee 30 mounted on the plug 100a. The embodiment is mounted on a joist 110 acting as a structural support. The plate 100b (not shown) and the optional plate 100c are attached to a joist or other structural support 110 by means of glue, screw, nails, or any other faster known in the art. This embodiment allows the tee 30 to act as a coupler for two pipes (not shown) while also providing structural stability for the pipe run. In this figure the tee 30 is parallel to the joist or other structural support 110. However, the tee 30 can be at any angle with respect to the joist or other structural support 110. Although shown with an L-shape, it is obvious that this variation could be a flat plate with a plug, or any shaped attachment plate that would be custom to any type of structural support.

Figure 38:
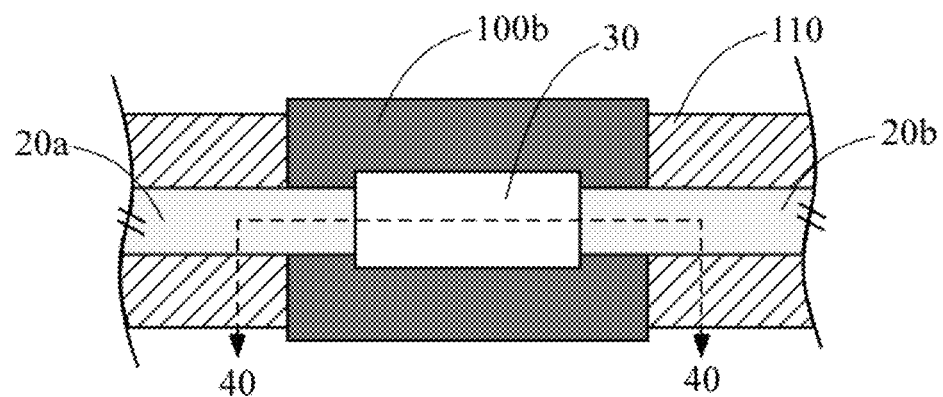
FIG. 38 is a top view of the embodiment of FIG. 33 with a tee and mounted on a joist.

FIG. 38 is an environmental top view with a tee 30, top plate 100b and mounted on a joist 110.

Figure 39:
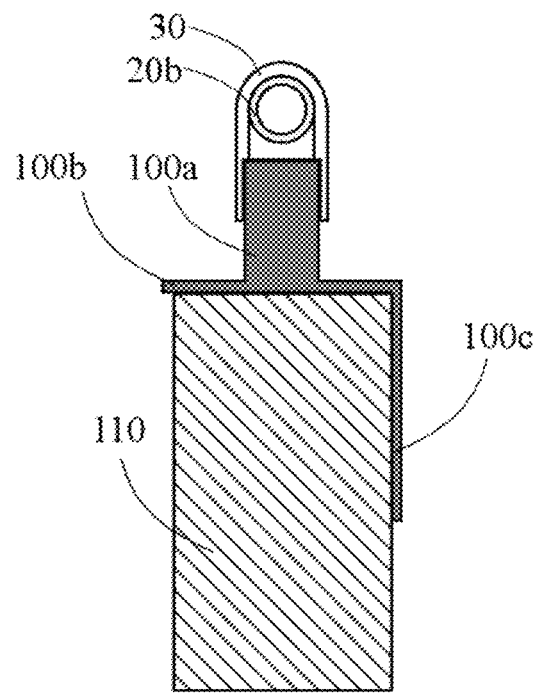
FIG. 39 is a section 39-39 view of the embodiment of FIG. 33.

FIG. 39 is a section 39-39 view of the embodiment of FIG. 37. Shown are tee 30 mounted on the plug 100a, which is mounted on plate 100b. Plates 100b and optional plate 100c are mounted onto a structural support, in this figure a joist 110.

Figure 40:
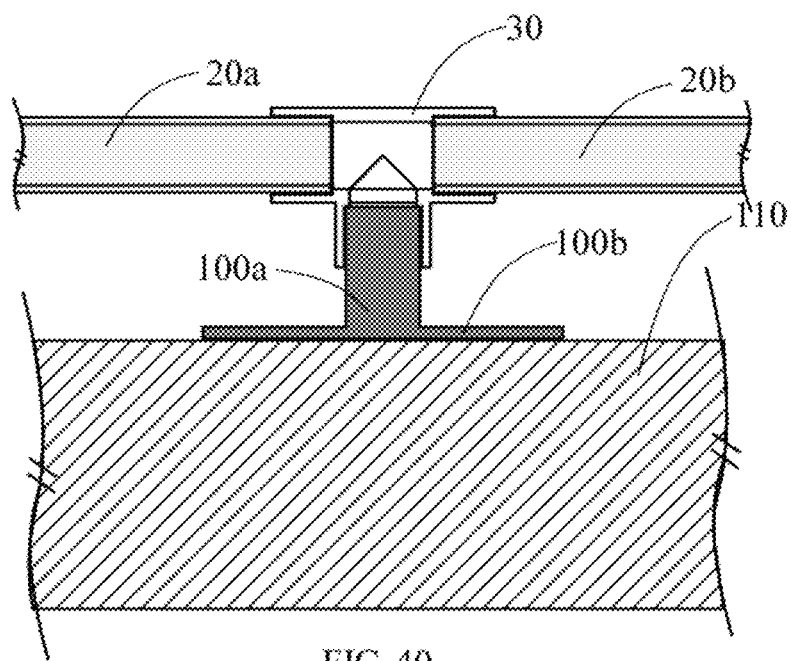
FIG. 40 is a section 40-40 view of the embodiment of FIG. 33.

FIG. 40 is a section 40-40 view of the embodiment of FIG. 38. Shown are tee 30 mounted on the plug 100a, which is mounted on plate 100b. Plate 100b is mounted onto a joist 110.

Figure 41:
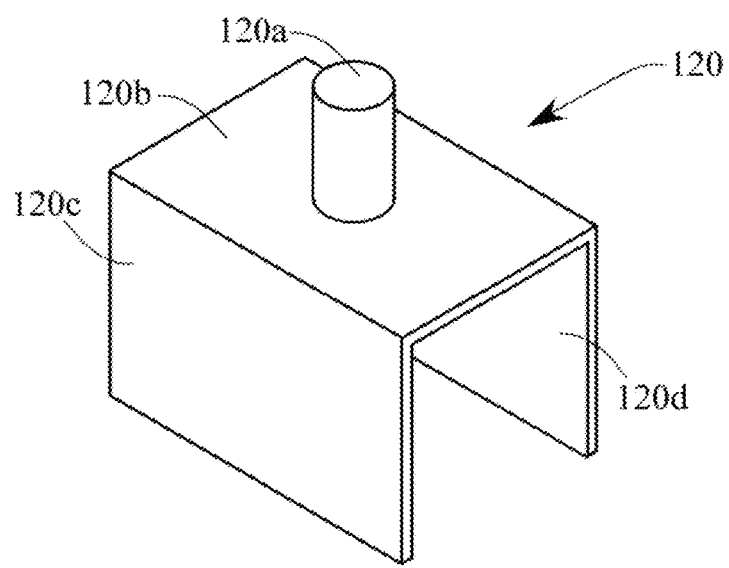
FIG. 41 is a perspective view of another embodiment of the invention.

FIG. 41 is a perspective view of another embodiment of the invention, 120. The solid plug 120a fits inside of one opening or socket of a pipe fitting (not shown) in order to permanently seal the socket closed thereby converting one opening of said pipe fitting into a mounting point used for supporting the pipe fitting (not shown) and any pipes connected to said pipe fitting to a structural support (not shown) by use of plate 120b, optional plate 120c, and optional plate 120d, while still allowing the fitting to function as a coupler for two pipes.

Figure 42:
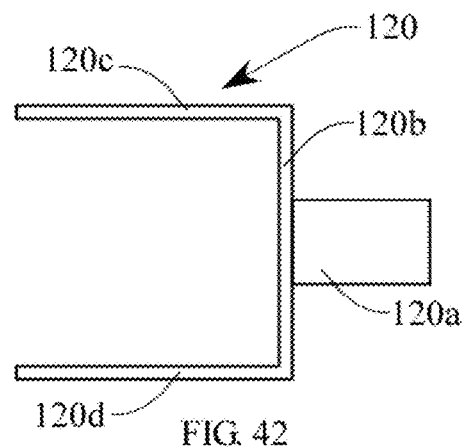
FIG. 42 is a side view of the embodiment of FIG. 41.

FIG. 42 is a side view of the embodiment, 120 showing plug 120a, plate 120b, optional plate 120c, and optional plate 120d. Plate 120b is perpendicular to optional plate 120c and optional plate 120d and form a U-shaped structure to which the plug 120a is attached. The U-shaped structure made of plate 120b, optional plate 120c, and optional plate 120d is attached to a joist or other structural support (not shown).

Figure 43:
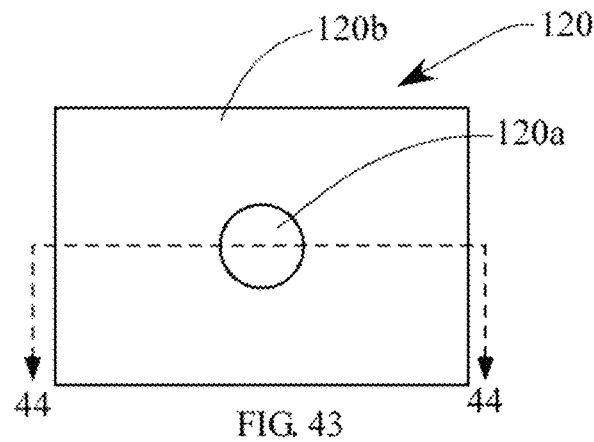
FIG. 43 is a top view of the embodiment of FIG. 41.

FIG. 43 is a top view of the embodiment, 120 showing plug 120a and plate 120b. Plug 120a is attached to the face of plate 120b.

Figure 44:
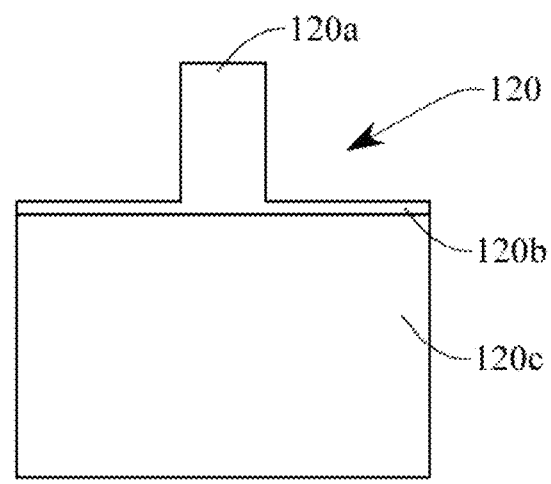
FIG. 44 is a section 36-36 view of the embodiment of FIG. 41.
Figure 45:
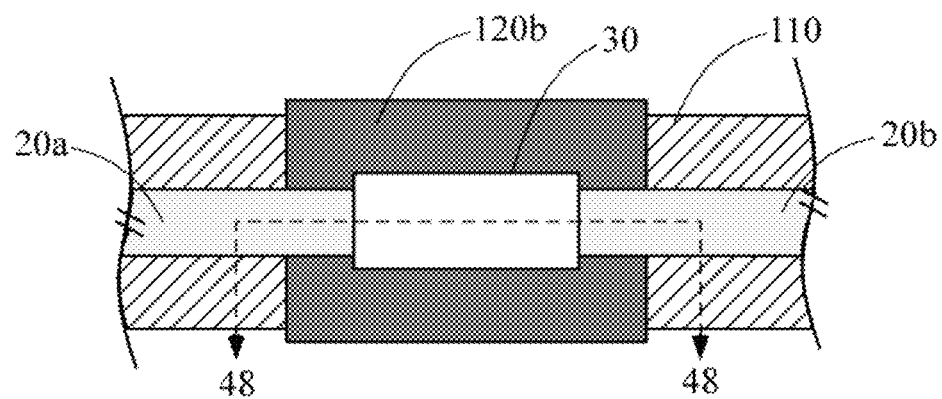
FIG. 45 is a side view of the embodiment of FIG. 41 with a tee and mounted on a joist.

FIG. 44 is a section 44-44 view of the embodiment of FIG. 41 showing the optional plate 120c and plug 120a attached to plate 120b.

FIG. 43 is an environmental top view with a tee 30, top plate 120b and mounted on a joist 110. In this figure the tee 30 is parallel to the joist or other structural support 110. However, the tee 30 can be at any angle with respect to the joist or other structural support 110. Although the plug is shown with a U-shaped structure, it is obvious that this variation could be a plug with a flat integrated plate, an L-shaped integrated plate, or any shaped attachment plate with a multiplicity of bends that would be custom to any type of structural support. This embodiment allows the tee 30 to act as a coupler for two pipes (not shown) while also providing structural stability for the pipe run.

Figure 46:
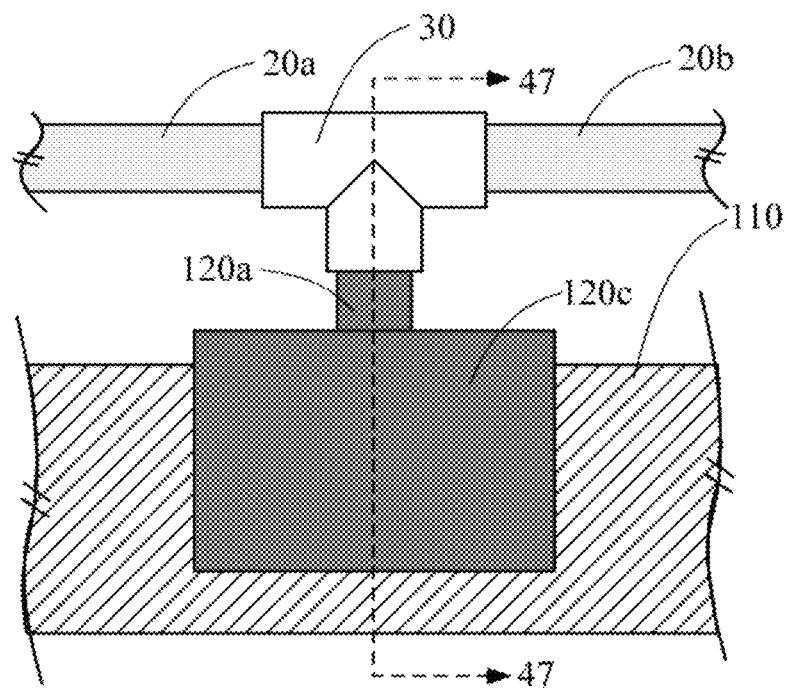
FIG. 46 is a top view of the embodiment of FIG. 41 with a tee and mounted on a joist.

FIG. 46 is an environmental side view showing optional plate 120c and a tee 30 mounted on the plug 120a. The embodiment is mounted on a joist 110.

Figure 47:
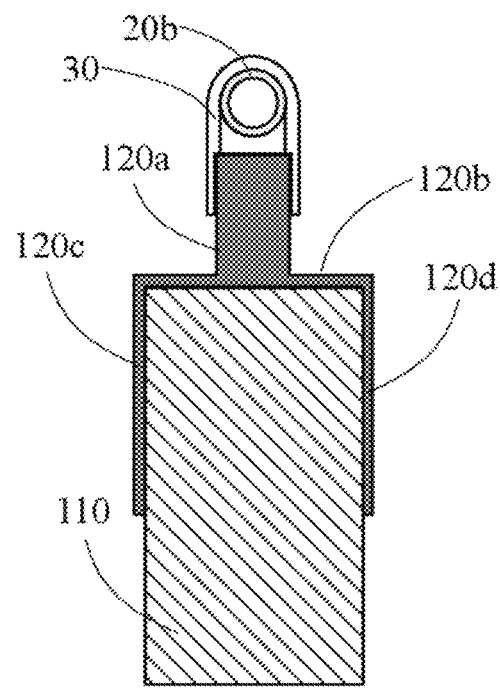
FIG. 47 is a section 47-47 view of the embodiment of FIG. 41.

FIG. 47 is a section 47-47 view of the embodiment of FIG. 41. Shown are tee 30 mounted on the plug 120a, which is mounted on plate 120b. Plate 120b, optional plate 120c, and optional plate 120d are mounted onto a joist 110.

Figure 48:
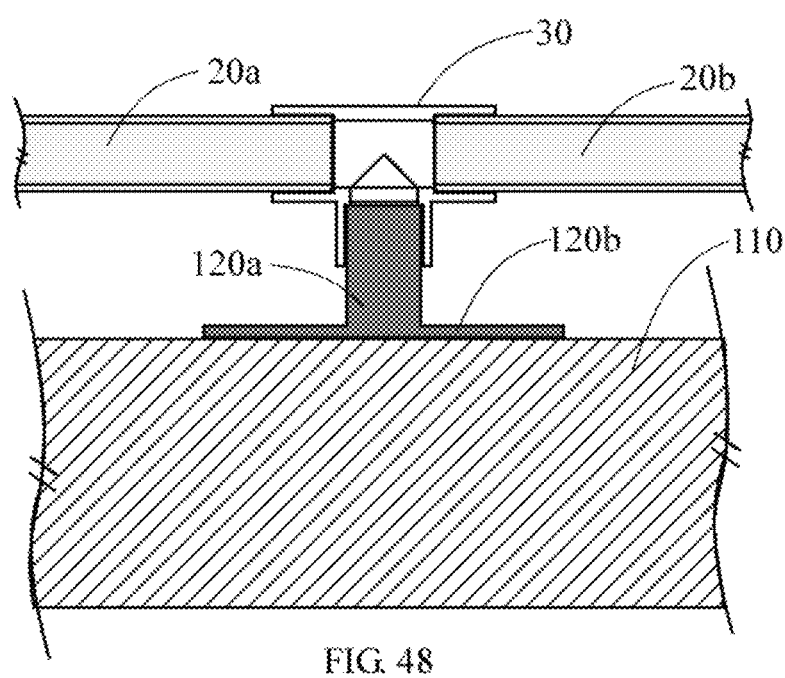
FIG. 48 is a section 48-48 view of the embodiment of FIG. 41.

FIG. 48 is a section 48-48 view of the embodiment of FIG. 41. Shown are tee 30 mounted on the plug 120a, which is mounted on plate 120b. Plate 120b is mounted onto a joist 110.

Figure 49:
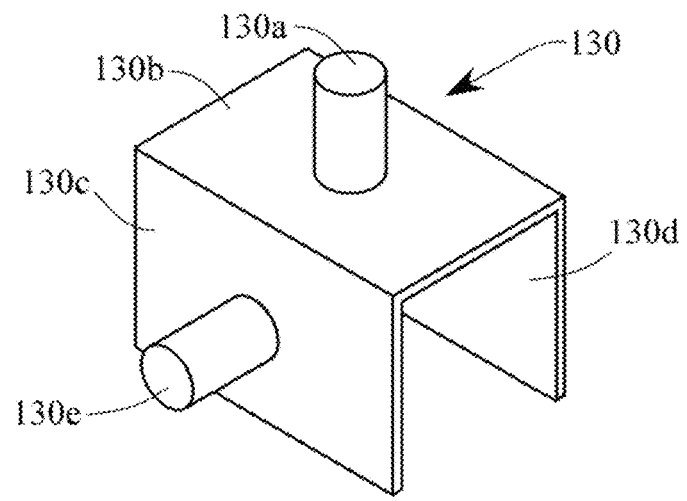
FIG. 49 is a perspective view of another embodiment of the invention.

FIG. 49 is a perspective view of another embodiment of the invention 130. The solid plugs 130a and 130e fit inside of one opening of two pipe fittings (not shown) that are perpendicular to each other in order to convert one opening of said pipe fitting into a mounting point used for supporting the pipe fitting and any pipes connected to said pipe fitting. This embodiment has plates 130b, 130c, and optional plate 130d form a U-shaped structure, with plugs 130a and 130e mounted on the face of plate 130b and 130c respectively. The U-shaped structure plate 130b, plate 130c, and optional plate 130d is attached to a joist or other structural support 110.

Figure 50:
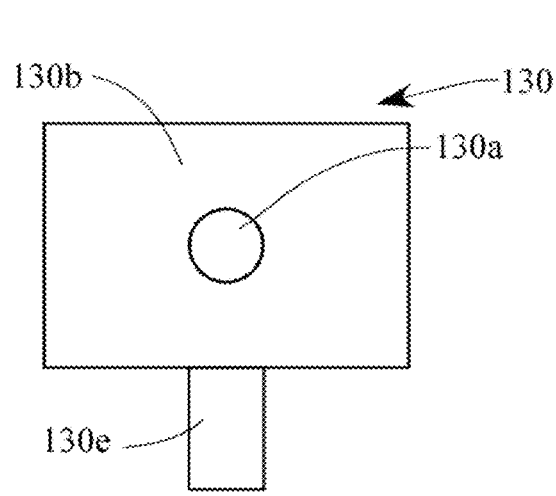
FIG. 50 is a top view of the embodiment of FIG. 49.

FIG. 50 is a top view showing plug 130a mounted on the face of plate 130b and plug 130e mounted on plate 130c (not shown).

Figure 51:
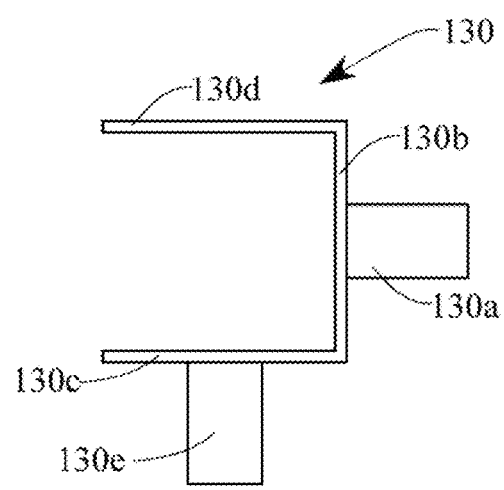
FIG. 51 is a side view of the embodiment of FIG. 49.

FIG. 51 is a side view showing plug 130a mounted to the face of plate 130b, plug 130e mounted to the face of plate 130c, and optional plate 130d.

FIG. 32 is an environmental side view of embodiment 130 with tee 30 mounted to plug 130a. Tee 30a is mounted to plug 130e (not shown) mounted to the face of plate 130c. The embodiment 130 and the tees are mounted to a joist 110. In this figure the tees 30 and 30a are parallel to the joist or other structural support. However, the tees 30 and 30a can be at any angle with respect to the joist 110 or other structural support. Although the plug is shown with a U-shaped structure, it is obvious that this variation could be a multiplicity of plugs with a flat integrated plate, an L-shaped integrated plate, or any shaped attachment plate with a multiplicity of bends that would be custom to any type of structural support.

Figure 53:
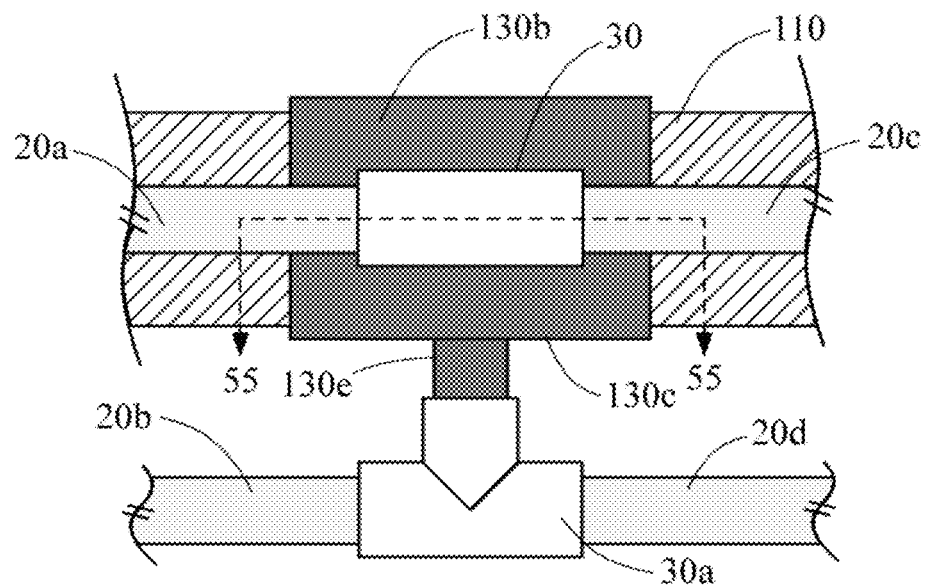
FIG. 53 is a top view of the embodiment of FIG. 49 with two tees and mounted on a joist.

FIG. 53 is an environmental top view of embodiment 130 with tee 30a mounted to plug 130e. Tee 30 is mounted to plug 130a (not shown) mounted to the face of plate 130b. The embodiment 130 and the tees are mounted to a joist 110.

Figure 52:
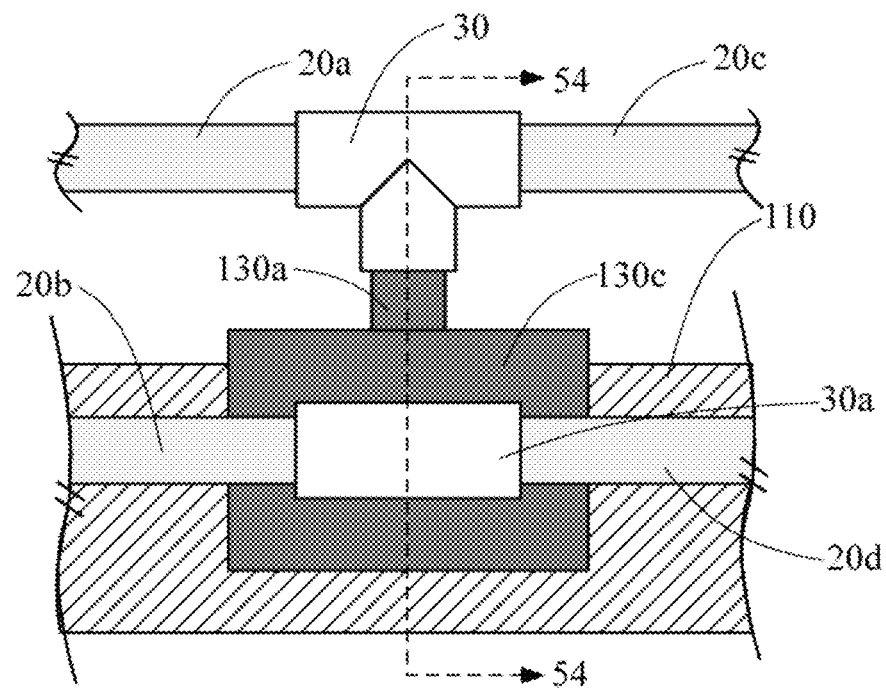
FIG. 52 is a side view of the embodiment of FIG. 49 with two tees and mounted on a joist.
Figure 54:
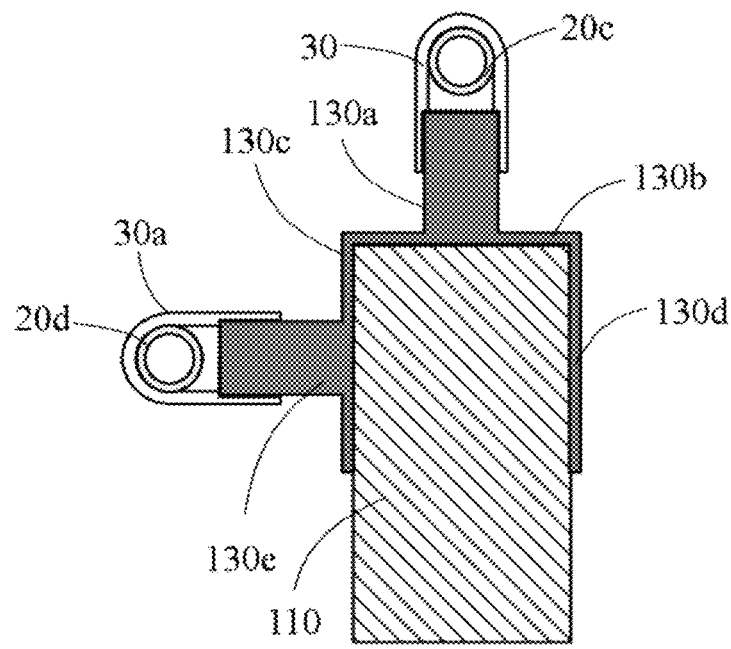
FIG. 54 is a section 54-54 view of the embodiment of FIG. 49.

FIG. 54 is a section 54-54 view of the embodiment of FIG. 52. Shown are tee 30 mounted to plug 130a which is mounted to the face of plate 130b. Tee 30a is mounted to plug 130e which is mounted to the face of plate 130c. Optional plate 130d, plate 130b, and plate 130c make up a L-Shaped structure used to mount to a joist 110. The embodiment 130 and the tees 30 and 30a are mounted to a joist 110.

Figure 55:
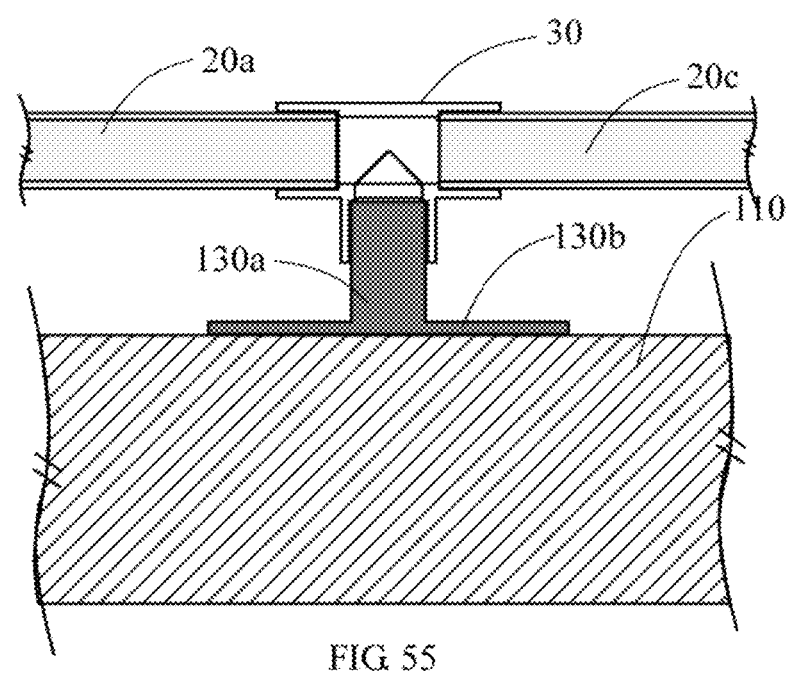
FIG. 55 is a section 55-55 view of the embodiment of FIG. 49.

FIG. 55 is a section 55-55 view of the embodiment of FIG. 53. Shown are tee 30 mounted to plug 130a which is mounted to the face of plate 130b. The embodiment 130 and the tee 30 are mounted to a joist 110.

Figure 56:
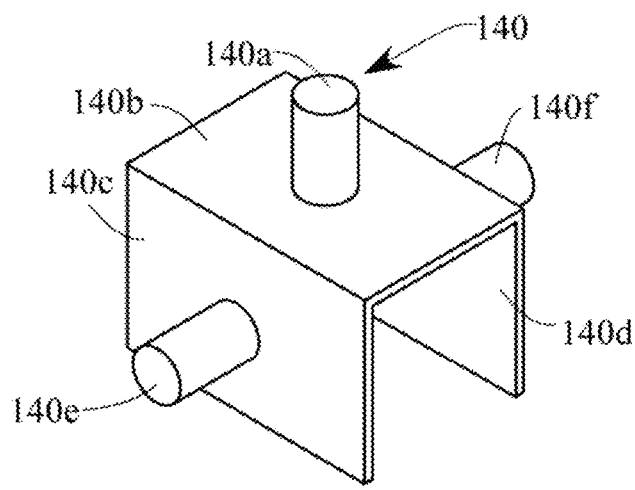
FIG. 56 is a perspective view of another embodiment of the invention.

FIG. 56 is a perspective view of another embodiment of the invention 140. The solid plugs 140a, 140e and 140f fit inside of one opening of three pipe fittings (not shown) that are perpendicular to each other in order to convert one opening of said pipe fitting into a mounting point used for supporting the pipe fitting and any pipes connected to said pipe fitting. This embodiment has plates 140b, 140c, and 140d forming a U-shaped structure, with plugs 140a, 140e, 140f mounted on the face of plate 140b, 140c, and 140d respectively. The U-shaped structure 140b, 140c, and 140d is attached to a joist or other structural support (not shown).

Figure 57:
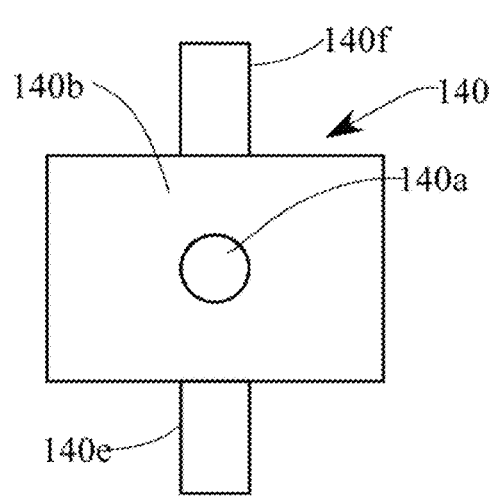
FIG. 57 is a top view of the embodiment of FIG. 56.

FIG. 57 is a top view showing plug 140a mounted on the face of plate 140b, plug 140e mounted to the face of plate 140c (not shown), and plate 140f mounted to plate 140d (not shown).

Figure 58:
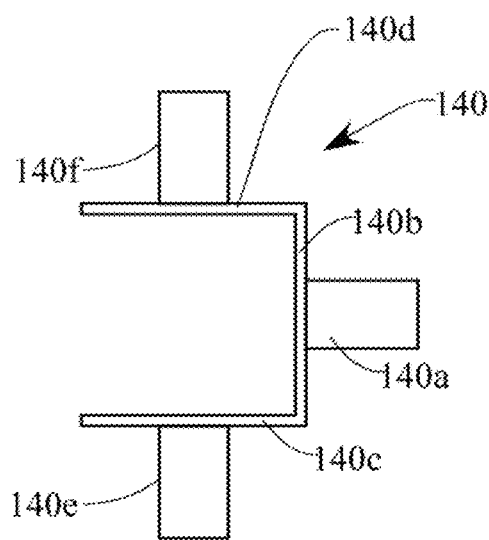
FIG. 58 is a side view of the embodiment of FIG. 56.

FIG. 58 is a side view showing plug 140a mounted to the face of plate 140b, plug 140e mounted to the face of plate 140c, and plate 140f mounted to plate 140d.

Figure 59:
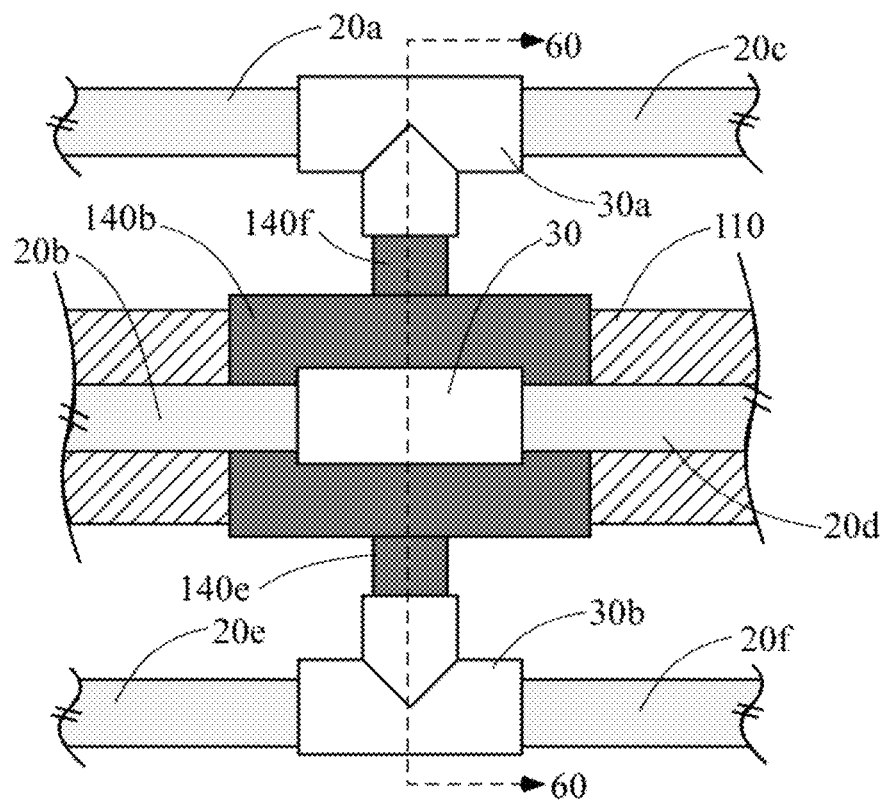
FIG. 59 is a top view of the embodiment of FIG. 56 with two tees and mounted on a joist.

FIG. 59 is an environmental side view of embodiment 140 with tee 30 mounted to plug 140a (not sown). Tee 30a is mounted to plug 140f, and tee 30b mounted to plug 140e. The embodiment 140 and the tees 30, 30a, and 30b are mounted to a joist 110. In this figure the tees 30, 30a, and 30b are parallel to the joist or other structural support 110. However, the tees 30, 30a, and 30b can be at any angle with respect to the joist or other structural support 110. Although the plug is shown with a U-shaped structure, it is obvious that this variation could be a plug with a flat integrated plate, an L-shaped integrated plate, or any shaped attachment plate with a multiplicity of bends that would be custom to any type of structural support.

Figure 60:
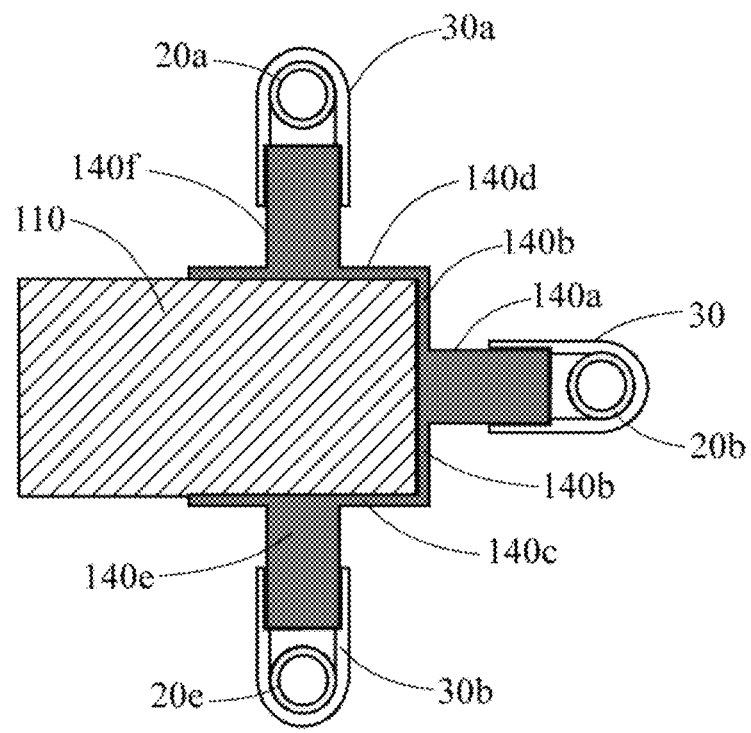
FIG. 60 is a section 60-60 view of the embodiment of FIG. 56.

FIG. 60 is a section 60-60 view of the embodiment of FIG. 59. Shown are tee 30 mounted to plug 140a which is mounted to the face of plate 140b. Tee 30a is mounted to plug 140f which is mounted to the face of plate 140d. Tee 30b is mounted to plug 140e which is mounted to the face of plate 140c. The embodiment 140 and the tees 30, 30a, 30b are mounted to a joist 110.

FIG. 61 is a perspective view of another embodiment of the invention, 150 showing plate 150d and two parallel plugs 150a and 150c mounted to the face of plate 150b which forms an L-shaped structure with optional plate 150d. The L-shaped structure 150b and 150d are attached to a joist or other structural support 110. If optional plats 150d is unused, then this embodiment of the invention could be mounted on a flat support structure.

FIG. 62 is a top view of the embodiment, 150 showing plugs 150a and 150c mounted to the face of plate 150b.

FIG. 63 is a side view of the embodiment, 150 showing plug 150a, plate 150b, and optional plate 150d. Plate 150b and optional plate 150d are perpendicular to each other and form an L-shaped structure to which the plugs 150a and 150c are attached.

FIG. 64 is another side view of the embodiment, 150 showing plugs 150a and 150c, and optional plate 150d. Plates 150b (not shown) and 150d are perpendicular to each other and form an L-shaped structure to which the plugs 150a and 150c are attached.

Figure 65:
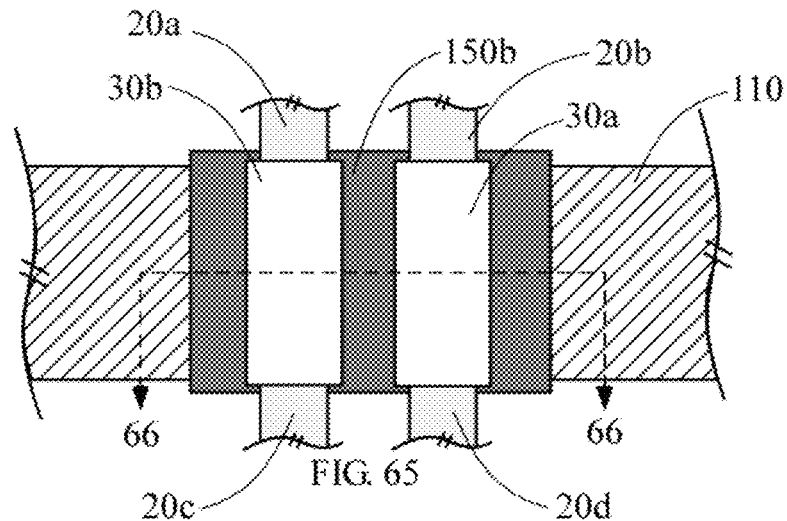
FIG. 65 is a top view of the embodiment of FIG. 61 with two tees and mounted on a joist.

FIG. 65 is an environmental top view of the embodiment of FIG. 61 showing parallel tees 30a and 30b mounted on the plugs 150a (not shown) and 150c (not shown) which is mounted on the face of plate 150b. The embodiment is mounted on a joist 110. In this figure the tees 30a and 30b are parallel to each other but perpendicular to the joist or other structural support 110. Although shown with an L-shape, it is obvious that this variation could be a flat plate with a multiplicity of plugs, or any shaped attachment plate that would be custom to any type of structural support.

Figure 66:
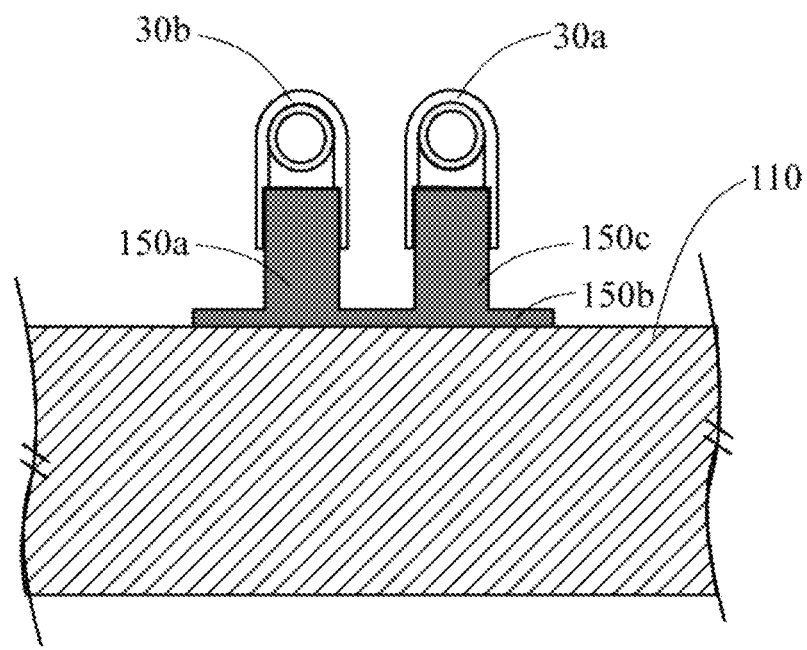
FIG. 66 is a section 66-66 view of the embodiment of FIG. 61 with two tees and mounted on a joist.

FIG. 66 is a section 66-66 view of the embodiment of FIG. 65. Shown are parallel tees 30a and 30b mounted to plugs 150a and 150c respectively, which are mounted to the face of plate 140b. The embodiment 150 and the tees 30a and 30b are mounted to a joist 110.

Figure 67:
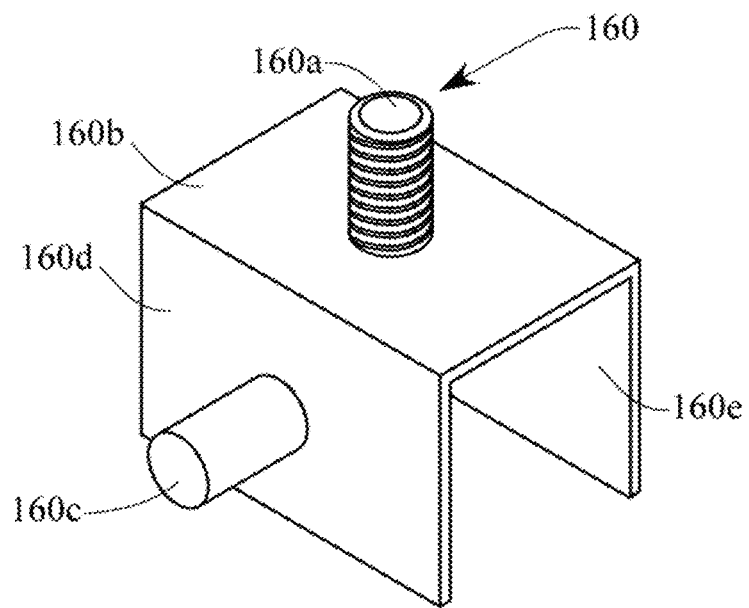
FIG. 67 is a perspective view of another embodiment of the invention.

FIG. 67 is a perspective view of another embodiment of the invention 160. This embodiment bas plate 160b, plate 160d, and optional plate 160c forming a U-shaped structure, with plugs 160a and 160c mounted on the face of plate 160b and 160d respectively. This embodiment has plug 160a being threaded and plug 160c a solvent weld style plug. The two plugs 160a and 160c may be the same or different sizes and/or the same or different materials as well as different mounting types.

Figure 68:
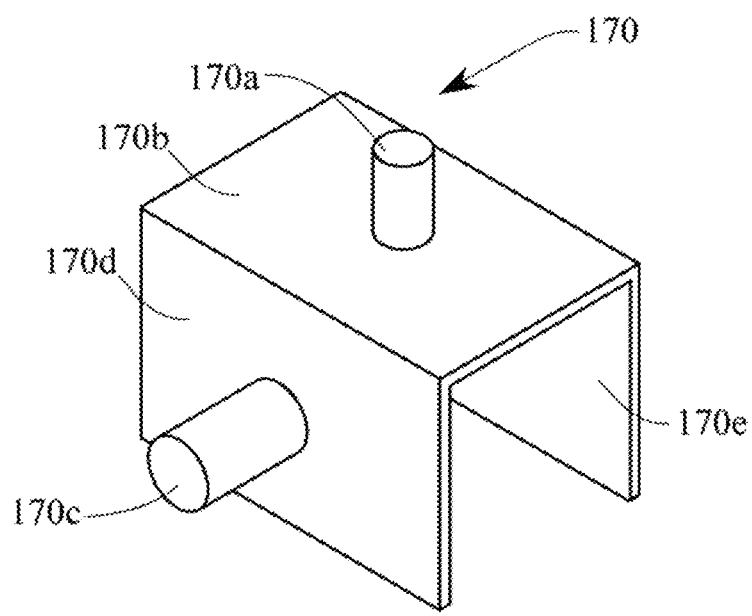
FIG. 68 is a perspective view of another embodiment of the invention.

FIG. 68 is a perspective view of another embodiment of the invention 170. This embodiment has plate 170b, plate 170d, and optional plate 170e forming a U-shaped structure, with plugs 170a and 170c mounted on the face of plate 170b and 170d respectively. This embodiment has two plugs 170a and 170c that may be the same or different sizes and/or the same or different materials and/or different mounting types.

Figure 69:
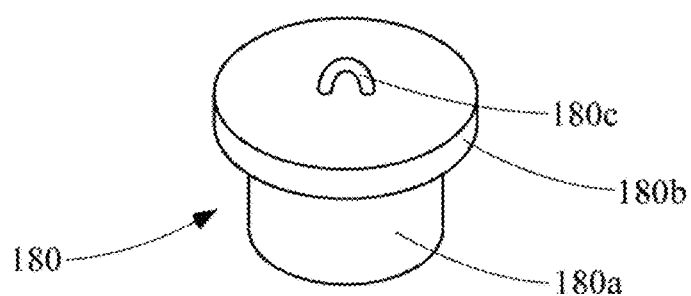
FIG. 69 is a perspective view of one embodiment of the invention.

FIG. 69 is a perspective view of one embodiment of the invention. The solid adapter plug 180 comprises a plug 180a and an optional flange 180b used to limit bow far plug 180a can be inserted into a pipe (not shown). The adapter plug 180a may have threads (not shown) for screwing the adapter 180 into a threaded socket (not shown). The adapter 180 has a mounting loop 180c for attaching a variety of mounting means, including but not limited to chain, a chain link and pipe hanger strapping. The adapter may also have a hole (not shown) in place of the mounting loop 180c for attaching a variety of mounting means including but not limited to threaded rod (not shown), barbed rod (not shown), or smooth rod (not shown) to the adapter 180.

Figures 70, 71, 72:
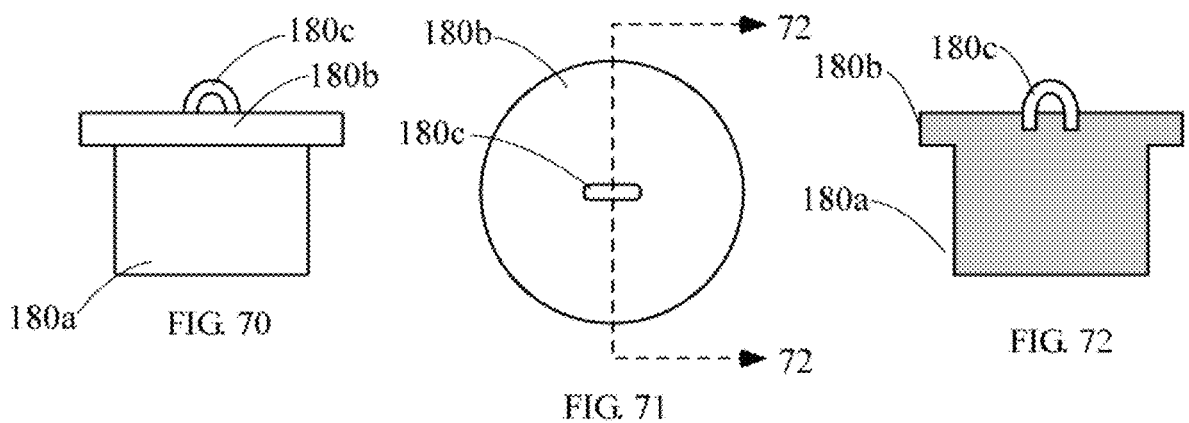
FIG. 70 is a side view of the embodiment of FIG. 69.
FIG. 71 is a top view of the embodiment of FIG. 69.
FIG. 72 is a section 72-72 view of the embodiment of FIG. 69.

FIG. 70 is a side view of the embodiment of FIG. 69. Shown are the plug 180a and the optional flange 180b. The optional flange 180b may be round in shape without knurling as seen in FIG. 71, or it may be round with knurling, hexagonal, or square if a threaded plug 180a is used.

FIG. 71 is a top view of the embodiment of FIG. 69. Shown are the plug 180a, mounting loop 180c, and the optional flange 180b.

FIG. 72 is a section 72-72 view of the embodiment of FIG. 69. Shown are the plug 180a, mounting loop 180c, and the optional flange 180b.

Figure 73:
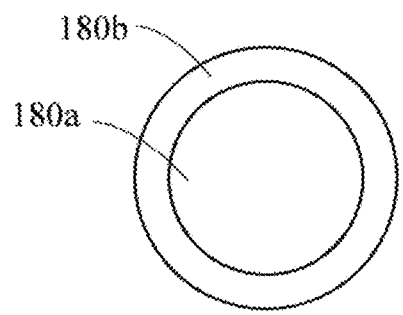
FIG. 73 is a bottom view of the embodiment in FIG. 69.

FIG. 73 is s bottom view of the embodiment in FIG. 69. Shown are the plug 180a and the optional flange 180b.

Figure 74:
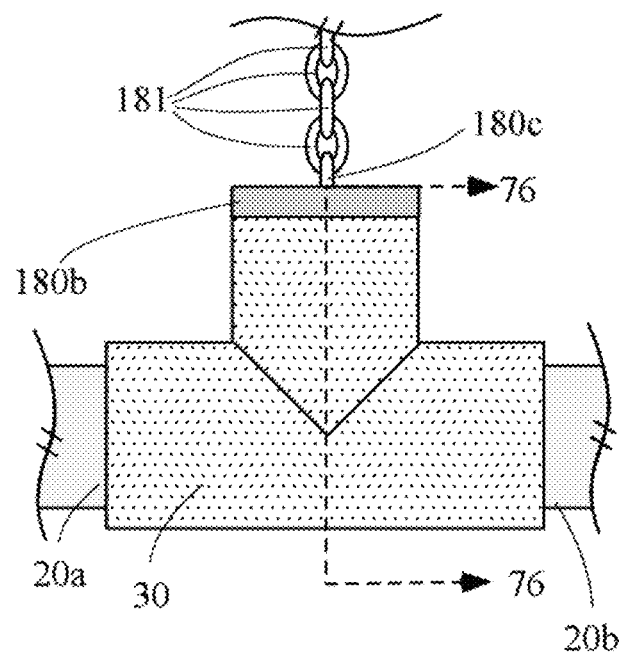
FIG. 74 is a side view of the embodiment of FIG. 69 with a tee, pipe, and mounted with a chain.

FIG. 74 is an environmental side view showing the solid adapter plug (only the optional flange 180b is visible) mounted to a structural member (not shown) with a chain 181 by the mounting loop 180c. Other mounting means may be used to mount the adapter plug to the structural member, including pipe hanger strapping. The adapter may also have a threaded hole (not shown) in place of the mounting loop 180c for attaching threaded rod (not shown) to the adapter 180. The other end of the adapter (not shown) is attached to a tee 30. The plug seals one socket or opening of the tee 30, allowing the tee 30 to be used to couple pipes 20a and 20b together.

Figure 75:
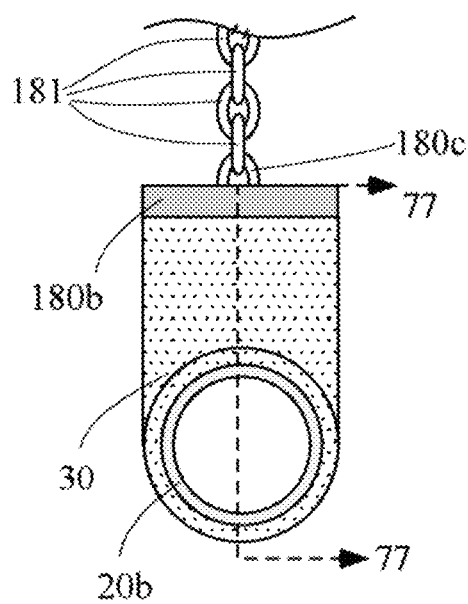
FIG. 75 is an end view of the embodiment of FIG. 69 with a tee, pipe, and mounted with a chain.

FIG. 75 is an environmental end view showing the solid adapter plug (only the optional flange 180b is visible) mounted to a structural member (not shown) with a chain 181 by the mounting loop 180c. Other mounting means may be used to mount the adapter plug to the structural member, including pipe hanger strapping. The adapter may also have a threaded bole (not shown) in place of the mounting loop 180c for attaching threaded rod (not shown) to the adapter 180. The other end of the adapter (not shown) is attached to a tee 30. The plug seals one socket or opening of the tee 30, allowing the tee 30 to be used to couple pipes 20a and 20b together.

Figure 76:
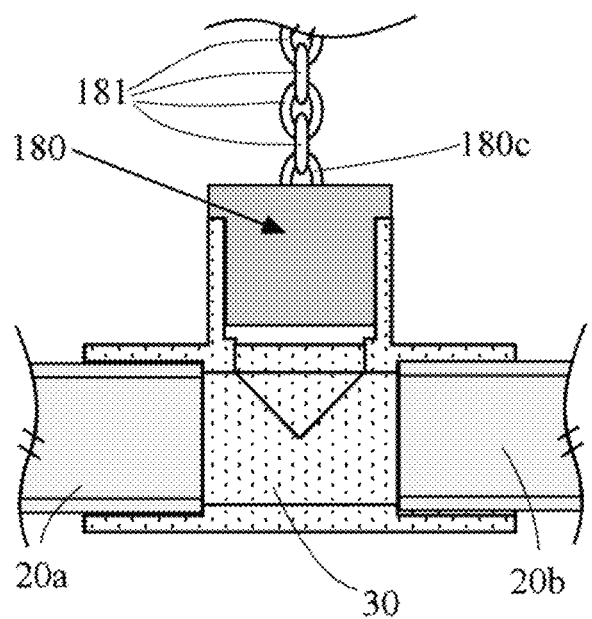
FIG. 76 is a section 76-76 view of the embodiment in FIG. 74.

FIG. 76 is a section 76-76 view showing the solid adapter plug 180 mounted to a structural member (not shown) with a chain 181 by the mounting loop 180c. The other end of the adapter is attached to a tee 30. The plug seals one socket or opening of the tee 30, allowing the tee 30 to be used to couple pipes 20a and 20b together.

Figure 77:
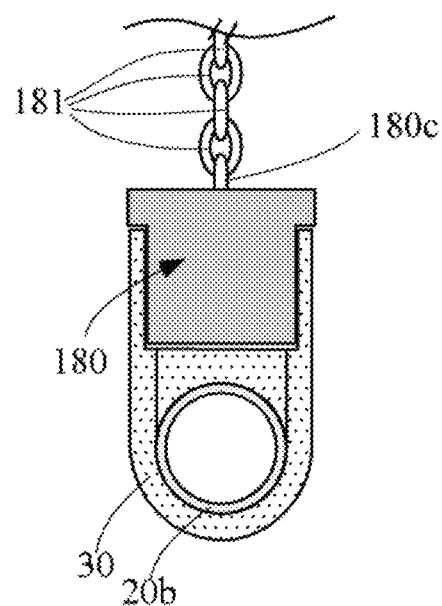
FIG. 77 is a section 77-77 view of the embodiment of FIG. 75.

FIG. 77 is a section 77-77 view showing the solid adapter plug 180 mounted to a structural member (not shown) with a chain 181 by the mounting loop 180c. The other end of the adapter is attached to a tee 30. The plug seals one socket or opening of the tee 30, allowing the tee 30 to be used to couple pipes 20b together.

SUMMARY

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. As an article of manufacture, a structural support plate with one or more plugs attached thereto, wherein each plug being insertable into a socket or opening of a pipe fitting so as to permanently seal the socket or opening of the pipe fitting and maintain a fixed distance between the structural support plate and the pipe fitting.

2. The article of claim 1 wherein each plug is made of a different material.

3. The article of claim 1 wherein the plugs are made of the same material.

4. The article of claim 1 wherein the plugs are of different sizes to accommodate different pipe fittings for different pipe diameters.

5. The article of claim 1 wherein the plugs are the same size.

6. The article of claim 1 wherein the plugs have different mounting means.

7. The article of claim 1 wherein the plugs have the same mounting means.

8. The article of claim 1 wherein there is a structural support plate in one plane.

9. The article of claim 1 wherein there are more than one structural support plates in different planes.

* * * * *